United States Patent
Moss et al.

(10) Patent No.: US 6,789,815 B2
(45) Date of Patent: Sep. 14, 2004

(54) STOWABLE-LOCK, CONVERTIBLE-PINTLE HITCH

(75) Inventors: Newell Ryan Moss, Mapleton, UT (US); Jack W. Bowers, Springville, UT (US); H. Arthur Wing, Provo, UT (US)

(73) Assignee: Wing Enterprises, Inc., Springville, UT (US)

( * ) Notice: Subject to any disclaimer, the term of this patent is extended or adjusted under 35 U.S.C. 154(b) by 0 days.

(21) Appl. No.: 10/159,778

(22) Filed: May 31, 2002

(65) Prior Publication Data

US 2003/0006581 A1 Jan. 9, 2003

Related U.S. Application Data

(63) Continuation-in-part of application No. 09/559,603, filed on Apr. 27, 2000, now Pat. No. 6,460,870, and a continuation-in-part of application No. 09/699,279, filed on Oct. 26, 2000, and a continuation-in-part of application No. 10/078,322, filed on Feb. 12, 2002.
(60) Provisional application No. 60/295,123, filed on Jun. 1, 2001.

(51) Int. Cl.[7] .................................................. B60D 1/54
(52) U.S. Cl. ................. 280/416.1; 280/512; 280/491.1; 280/491.3; 280/416.1
(58) Field of Search ............................. 280/507, 491.3, 280/511, 512, 513, 491.1, 491.2, 491.4, 492, 416.1, 483, 166, 490.1

(56) References Cited

U.S. PATENT DOCUMENTS

| | | |
|---|---|---|
| 2,221,278 A | 11/1940 | Utterback |
| 2,547,299 A | 4/1951 | Williams |
| 2,604,331 A | 7/1952 | Kingston |
| 2,823,930 A | 2/1958 | Cooper |
| 2,849,243 A | 8/1958 | Halverson |

(List continued on next page.)

FOREIGN PATENT DOCUMENTS

| | | |
|---|---|---|
| BE | 715 681 A | 10/1968 |
| DE | 3639183 | 8/1987 |
| FR | 2227739 | 11/1974 |
| FR | 2450167 | 10/1980 |

OTHER PUBLICATIONS

JC Whitney Catalog, Business Edition Catalog No. 630B, pp. 79–81.
Boating Life, p. 89, Sep./Oct. 1999.
Trailer Boats, p. 90, Sep. 1999.
Herrington, The Enthusiasts Catalog, p. 1, Memorial Day '00.
Northern Tool & Equipment Co., pp. 278–281, Summer 2000.

Primary Examiner—Lesley D. Morris
Assistant Examiner—Daniel Yeagley
(74) Attorney, Agent, or Firm—TraskBritt

(57) ABSTRACT

A towing apparatus is provided including, in one embodiment, a pintle hitch having a retainer and an associated retainer lock. The retainer may be coupled with a mount by way of a pivot allowing it to rotate into and out one or more selected positions. The retainer may also be mounted on a guide such that it may translate relative to a mount. The apparatus may be configured to be selectively displaced between a towing position and a stowed position. Additionally, the mount of the apparatus may be adjustably coupled with the base. In such a case, the apparatus may have another guide to enable the mount to translate relative to the base. This may allow the mount to be height-adjustable and provide further versatility. In one embodiment, a swiveling mount may allow the mount to swivel relative to the base to accommodate the towing of trailers over rugged terrain.

33 Claims, 23 Drawing Sheets

U.S. PATENT DOCUMENTS

| | | | |
|---|---|---|---|
| 2,872,213 A | 2/1959 | Hosford | |
| 2,889,155 A | 6/1959 | Sandage | |
| 3,117,805 A | 1/1964 | Schoeffler | |
| 3,630,546 A | 12/1971 | Church | |
| 3,655,221 A | 4/1972 | Warner | |
| 3,664,686 A | 5/1972 | Anderson | |
| 3,717,362 A | 2/1973 | Johnson | |
| 3,734,540 A | 5/1973 | Thiermann | |
| 3,751,072 A | 8/1973 | Williams | |
| 3,779,653 A | 12/1973 | Charlton | |
| 3,801,134 A | 4/1974 | Dees | |
| 3,891,238 A | 6/1975 | Ehlert | |
| 3,922,006 A | * 11/1975 | Borges | 280/416.1 |
| 3,963,266 A | 6/1976 | Thelin | |
| 3,979,138 A | 9/1976 | George et al. | |
| 4,022,490 A | 5/1977 | Rocksvold | |
| 4,033,601 A | 7/1977 | Lindahl et al. | |
| 4,208,065 A | * 6/1980 | Hansen | 280/507 |
| 4,232,877 A | 11/1980 | Milton | |
| 4,248,450 A | 2/1981 | McWethy | |
| 4,275,899 A | 6/1981 | Humphrey | |
| 4,456,279 A | 6/1984 | Dirck | |
| 4,482,167 A | 11/1984 | Haugrud | |
| 4,492,386 A | 1/1985 | Roberts | |
| 4,568,098 A | 2/1986 | Landry, Jr. | |
| 4,610,457 A | 9/1986 | Harmon | |
| 4,697,818 A | 10/1987 | Moore | |
| 4,711,461 A | 12/1987 | Fromberg | |
| 4,721,324 A | 1/1988 | Blacklaw | |
| 4,758,015 A | 7/1988 | Pixley | |
| 4,772,039 A | 9/1988 | Cook | |
| 4,792,153 A | 12/1988 | Galdes | |
| 4,807,899 A | 2/1989 | Belcher | |
| 4,807,900 A | 2/1989 | Tate | |
| 4,844,498 A | 7/1989 | Kerins et al. | |
| 4,938,496 A | 7/1990 | Thomas et al. | |
| 4,944,525 A | 7/1990 | Landry | |
| 4,951,957 A | 8/1990 | Gullickson | |
| 5,000,473 A | 3/1991 | Johnson | |
| 5,033,764 A | 7/1991 | Blacklaw | |
| 5,088,754 A | 2/1992 | Skelton | |
| 5,106,114 A | 4/1992 | Haupt | |
| 5,135,247 A | 8/1992 | Alfaro et al. | |
| 5,288,095 A | 2/1994 | Swindall | |
| 5,312,128 A | 5/1994 | Blacklaw | |
| 5,322,313 A | 6/1994 | Schroeder | |
| 5,322,315 A | 6/1994 | Carsten | |
| 5,332,250 A | 7/1994 | Thorwall et al. | |
| 5,351,982 A | 10/1994 | Walrath | |
| 5,375,867 A | 12/1994 | Kass et al. | |
| 5,413,366 A | 5/1995 | Gibbons | |
| 5,465,991 A | 11/1995 | Kass et al. | |
| 5,503,423 A | 4/1996 | Roberts et al. | |
| 5,560,630 A | 10/1996 | Phares et al. | |
| 5,580,088 A | 12/1996 | Griffith | |
| 5,725,229 A | 3/1998 | McWethy | |
| 5,727,805 A | 3/1998 | La Roque | |
| 5,741,022 A | 4/1998 | Wass et al. | |
| 5,806,872 A | 9/1998 | Szczypski | |
| 5,839,744 A | 11/1998 | Marks | |
| 5,857,693 A | 1/1999 | Clark, Jr. | |
| 5,860,669 A | 1/1999 | Wass et al. | |
| 5,871,222 A | 2/1999 | Webb | |
| 5,890,727 A | 4/1999 | May | |
| D409,124 S | 5/1999 | Bank | |
| 5,906,387 A | 5/1999 | Wallace | |
| 5,915,714 A | 6/1999 | Bell et al. | |
| 5,934,698 A | 8/1999 | Despain | |
| 5,975,553 A | * 11/1999 | Van Vleet | 280/483 |
| 6,092,827 A | 7/2000 | Korpi et al. | |
| 6,116,633 A | 9/2000 | Pride | |
| 6,139,043 A | 10/2000 | Gries et al. | |
| 6,142,238 A | 11/2000 | Holt et al. | |
| 6,149,181 A | 11/2000 | Biederman | |
| 6,460,870 B2 | 10/2002 | Moss | |
| 6,511,086 B2 | * 1/2003 | Schlicht | 280/166 |

* cited by examiner

STOWABLE-LOCK, CONVERTIBLE-PINTLE HITCH

Related Applications

This patent application claims the benefit of U.S. Provisional Patent Application Serial No. 60/295,123, filed Jun. 1, 2001 and entitled "STOWABLE-LOCK, CONVERTIBLE-PINTLE HITCH AND SILENCER." This application is also a continuation-in-part of patent application Ser. No. 09/559,603, filed Apr. 27, 2000, now U.S. Pat. No. 6,460,870, issued Oct. 8, 2002. In addition this application is also a continuation-in-part of patent application Ser. No. 09/699,279, filed Oct. 26, 2000, and entitled "PIVOTING, UNDERSLUNG, STOWAWAY, HITCH MOUNT," now U.S. Pat. No. 6,712,381, issued Mar. 30, 2004. This application is also a continuation in part of co-pending patent application Ser. No. 10/078,322, filed Feb. 12, 2002, and entitled "MONOLITHIC DOUBLE-BALL HITCH."

BACKGROUND

1. Field of the Invention

This invention relates to towing apparatus and, more particularly, to novel systems and methods for securing trailers to towing vehicles with hitches.

2. The Background Art

Trailers have been towed since the earliest days of the wheel. A cart or wagon towed behind an animal is a trailer. In modern times, trailers are secured to towing vehicles by a multiplicity of methods, including frame-mounted hitches and bumper-mounted hitches. Tractor-trailer rigs often use pintle-type fifth-wheel towing systems. Similarly, recreational vehicles sometimes use fifth-wheel towing systems or often a receiver-type mounted ball hitch.

A receiver hitch relies on a receiver cavity or tube securely mounted to the frame or undercarriage of a towing vehicle. The receiver may be reinforced and is provided with an aperture for receiving a trunnion. A trunnion may be secured into the receiver by a lock, such as a pin. On the trunnion may be mounted a hitch. The hitch may be a pintle hitch or ball hitch, typically, but need not be limited thereto.

Pintle style hitches are typically complicated mechanisms and make use of parts having complex geometries. Pintle hitches also generally have complex locking mechanisms that have limited functionality, locking only in one position.

Typical pintle hitches are bulky and must remain in a deployed position. Accordingly it would be an advancement in the art to provide a pintle hitch system that is stowable while remaining connected to a vehicle. It would also be an advancement in the art to provide a pintle hitch providing this functionality while at the same time having a simple design making it easy to manufacture. Providing a simpler design would also make such a pintle hitch easier and safer to use and less prone to failure.

Typical hitch systems are designed for towing trailers over substantially smooth roads. There is typically little accommodation for twisting of the trailer relative to the towing vehicle. Thus, it would be an advancement in the art to provide a towing system that was able to accommodate such twisting motion. Such a system would facilitate the towing of trailers and the like over rugged terrain.

BRIEF SUMMARY OF THE INVENTION

An apparatus is disclosed in sufficient detail to enable one of ordinary skill in the art to make and use the invention. In certain embodiments an apparatus in accordance with the invention may have a trunnion for insertion into a receiver tube or cavity of a vehicle. A base may be secured to the trunnion or to the vehicle. The base may also have a mount secured thereto. The mount may have a platform that is sized and positioned to receive a hitch.

Various details of bases, mounts, and the like are discussed in U.S. patent application Ser. No. 09/559,603 filed Apr. 27, 2000 and entitled STOWAWAY RECEIVER HITCH, now U.S. Pat. No. 6,460,870, issued Oct. 8, 2002; U.S. patent application Ser. No. 09/699,279 filed Oct. 26, 2000 and entitled PIVOTING, UNDERSLUNG, STOWAWAY, HITCH MOUNT, now U.S. Pat. 6,712,381, issued Mar. 30, 2004; and U.S. patent application Ser. No. 10/078,322 filed Feb. 12, 2002 and entitled MONOLITHIC DOUBLE-BALL HITCH incorporated herein by reference.

The mount may also have a retainer that may be moved into position and locked in order to prevent removal of a pintle ring from around the hitch. The retainer may be mounted on a pivot allowing it to rotate into and out of position. It may also be mounted on a guide such that it may translate relative to the mount. Through rotation and translation, the retainer may be moved to positions suitable for temporarily holding the retainer and for locking the retainer into position. The pivot and guide may be positioned such that the retainer can not be both rotated and translated at the same time. For example, the retainer may be rotated about the pivot and translated into a position where rotation is substantially impossible. This may allow the retainer to be placed out of the way so that a pintle ring can be brought down over the hitch. Likewise the retainer may be brought into a position where it is only possible to rotate the hitch about the pivot. The retainer may be of very simple construction such as a substantially flat plate in which needed apertures and outlines are formed.

A stop on the platform may engage a surface on a hitch and prevent it from rotating. This may facilitate installation of a hitch. For example, the stop engaging the hitch may enable a user to use a single wrench to tighten down a nut holding the hitch to the platform. The stop could be as simple as a shoulder or flat formed in the platform.

The mount may be adjustable relative to the base. The apparatus may have another guide to enable the mount to translate relative to the base. This may allow the mount to be height-adjustable and provide versatility of operation. The mount and base may also be secured to one another by a pivot allowing the mount to rotate into a variety of positions. This may enable the mount to be secured in an unobtrusive stowed position.

Locks may be used to fix the position of the retainer relative to the mount and the position of the mount relative to the base. In some embodiments the locks may be locking pins extending through apertures formed in both of the members, thus fixing the members relative to one another.

The base may have a height index that receives the locks so that the mount may be secured at a variety of positions relative to the base. In some embodiments the height index may be a series of apertures formed in the base and sized to receive the locking pins.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 26, is not intended to limit the scope of the invention. The scope of the invention is as broad as claimed herein. The illustrations are merely representative of certain embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example.

Figure 1:
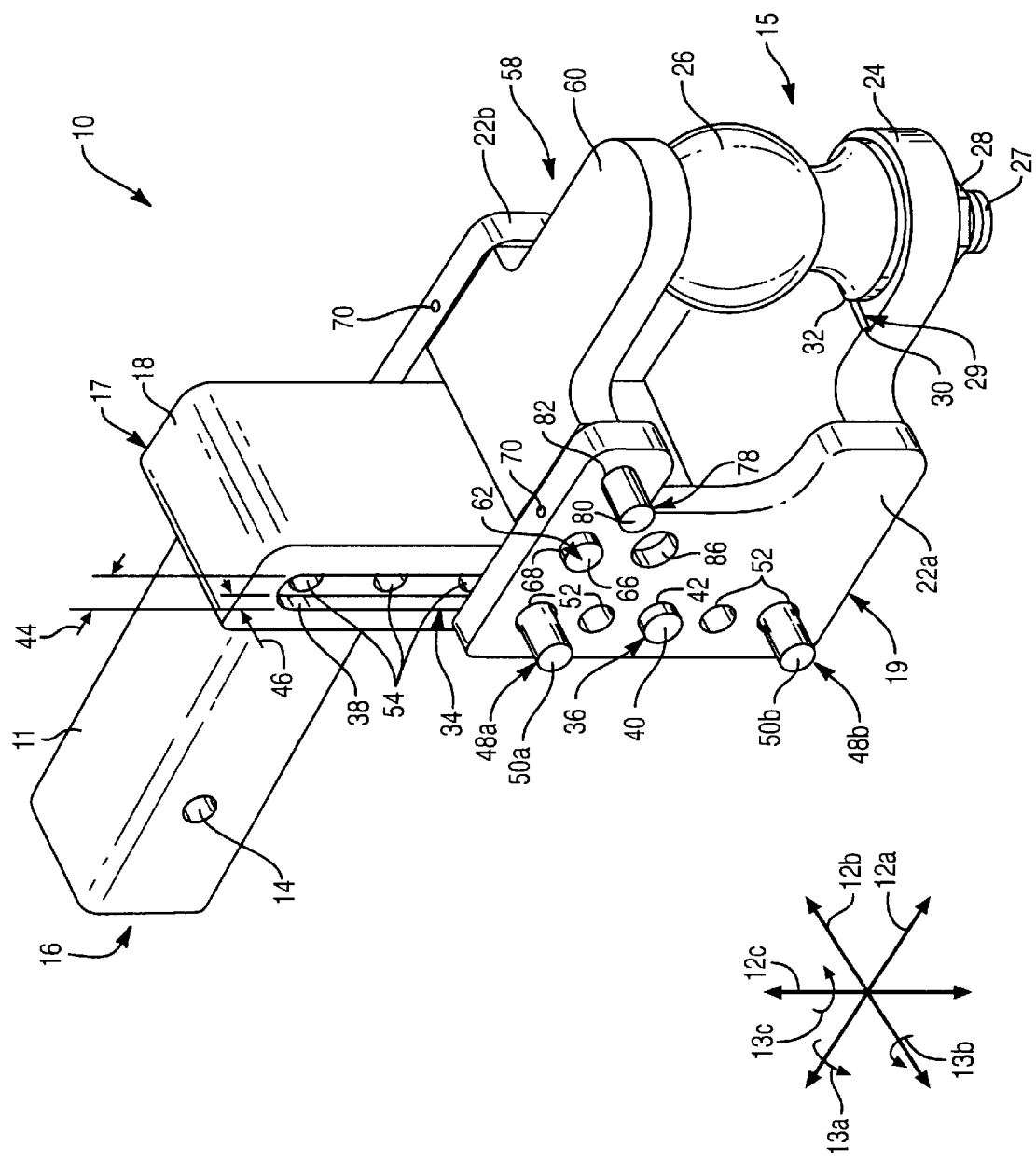
FIG. 1 is a perspective view of one embodiment of a pintle-hitch mounting mechanism, in a deployed and closed position, in accordance with the invention.
Figure 2:
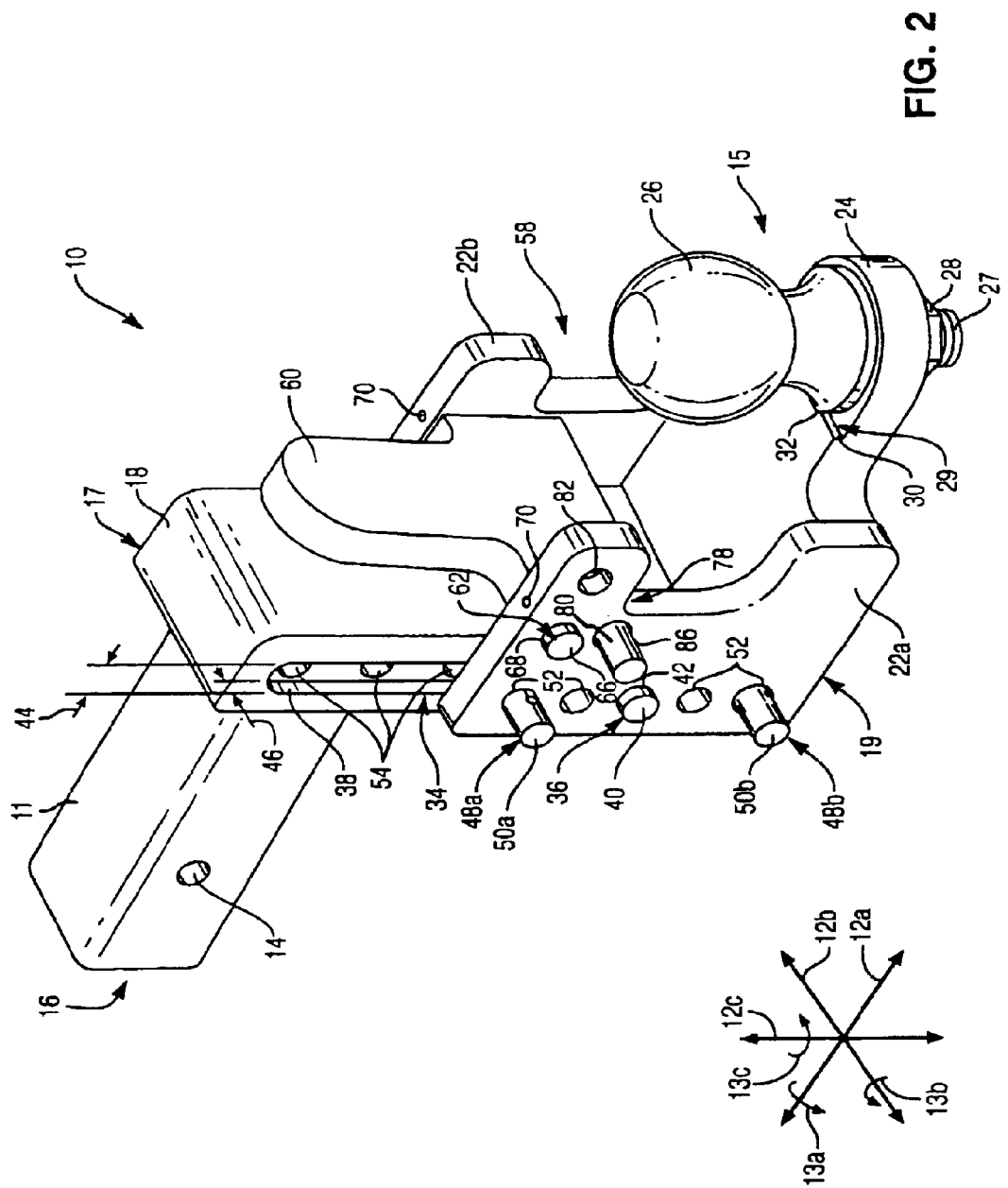
FIG. 2 is a perspective view of one embodiment of a pintle-hitch mounting mechanism, in a deployed and open position, in accordance with the invention.

Referring to FIGS. 1 and 2, an apparatus 10 may include a trunnion 11. The trunnion 11 may define a longitudinal direction 12a. Lateral and transverse directions, 12b and 12c respectively, may be defined so that they are substantially mutually orthogonal to each other and to the longitudinal direction 12a. Directions 12a–12c may also be considered to be or define axes 12a–12c. Accordingly, rotational directions 13a, 13b, and 13c may be defined as rotation about the axes 12a, 12b, and 12c, respectively, or axes translated therefrom.

The trunnion 11 may have any suitable cross-section and length. Additionally, the trunnion 11 may have a lock to maintain it securely fastened to a receiver (not shown), which may be secured to the undercarriage of a vehicle. In one embodiment, the lock may be a locking aperture 14 admitting a locking pin (not shown) therethrough.

The apparatus 10, and the components thereof, may have a rearward end 15 and a forward end 16. This terminology may be used to refer to the apparatus 10 from the reference frame of the towing vehicle. Thus, the rearward end 15 extends away from the towing vehicle and forward end 16 extends toward the towing vehicle. In the certain embodiments of the present invention, the apparatus 10 and the components thereof are made of steel, however, aluminum, other ferrous alloys, or any other material possessing sufficient strength and durability may be used.

An apparatus 10 may include a base 17. The base 17 typically attaches to the rearward end 15 of the trunnion 11. The base 17 is typically substantially permanently attached to the trunnion 11. In some embodiments, the trunnion 11 may be omitted and the base 17 may secure directly to structures of the towing vehicle. The base 17 may also be embodied as part of the towing vehicle such as a bumper. A base 17 may be embodied as a block 18. The block 18 may be attached to the trunnion 11 by means of welds, bolts, or other means of attachment An apparatus 10 may include a mount 19. The mount 19 may secure to the base 17 in a variety of ways. The mount 19 may be secured to the base 17 in a manner allowing for no movement of mount 19 relative to base 17. The mount may be integrally attached to base 17. It may be part of the same monolithic piece of material, or it may be attached by means of welds, bolts, or any other suitable securing means.

The mount 19 may be secured to the base 17 in a manner allowing for movement of the mount 19 relative to a base 17. In some embodiments of the apparatus 10, the mount 19 may be pivotably attached to the base 17. The mount 19 may pivot with respect to the base 17 between a deployed position and a stowed position. In certain embodiments of the apparatus 10, the mount 19 and base 17 may be configured to allow the mount 19 to translate relative to base 17. In certain embodiments, the mount 19 may be selectively lockable to the base 17 in a plurality of fixed positions, orientations, or both.

A mount 19 may include two side beams 22a, 22b parallel to one another and attached to a platform 24. Beams 22a, 22b may attach to platform 24 by any attachment means capable of withstanding the magnitude of forces developed while towing a trailer. In one embodiment the beams 22a, 22b are attached to the platform 24 by means of welds. Alternatively, the mount 19 may be formed as a monolithic member comprising surfaces and extensions providing the same functionality as a platform 24 and side beams 22a, 22b.

In certain embodiments an apparatus 10 may include a hitch 26 such as one that might attach directly to a rearward end 15 of a mount 19. The hitch 26 may be a ball hitch 26, a pintle hitch 26 or any other type of hitch 26 suitable for serving as an attachment point for a trailer or other towed vehicle. One embodiment of the present invention may be capable of towing trailers having pintle rings as well as those having ball couplers. Accordingly the hitch 26 would typically be embodied as a ball hitch 26. In some embodiments the hitch 26 may secure to the platform 24 by means of a threaded bolt 27 and a nut 28. The platform 24 of the mount 19 may have a stop 29 configured to engage the hitch 26 in a manner to resist rotation of the hitch 26 with respect thereto. A stop 29 may allow a nut 28 to be tightened without requiring user intervention to prevent the rotation of the hitch 26, thereby reducing the number of tools and hands needed to attach the hitch 26 to the platform 24. In one embodiment, the stop 29 is a surface 30 formed to correspond to a surface 32 on the hitch 26. The surfaces 30 and 32 may be flat, or may have any other contour capable of preventing rotation of the hitch 26.

A base 17 and a mount 19 may be coupled by means of guides 34. The guides 34 may provide for translation and rotation of the mount 19 relative to the base 17. The guides 34 may be integrally or monolithically attached to the base 17 and engage pivots 36 attached to mount 19. Alternatively the guides 34 may be integrally attached to the mount 19 or be monolithically formed with the mount 19 to engage pivots 36 attached to the base 17.

In the embodiment shown, the guides 34 are slots 38 in the block 18. The slots 38 typically extend in a transverse direction 12c. A slot 38 may have a width 44 in longitudinal direction 12a and a depth 46 in lateral direction 12b. The pivots 36 may be embodied as studs 40 inserted in the apertures 42 of the side beams 22a, 22b. The studs 40 are typically of sufficient length to extend through apertures 42 and into slots 38 a distance slightly less than the depth 46 of the slot 38. The studs 40 are typically of suitable dimensions to allow them to rotate and translate substantially freely within the slots 38.

An apparatus 10 may also include a lock 48a or 48b or two locks 48a, 48b. A lock 48a, 48b may prevent motion of the mount 19 in at least one direction 12a–12c, 13a–13c relative to the base 17, when engaged. Two locks 48a, 48b may be used when towing heavy loads in order to increase the bearing surface transferring loads between the mount 19 and the base 17.

A lock 48a, 48b may be embodied as a pin 50a, 50b extending through an aperture 52 in the side beam 22a, through an aperture 54 in the block 18, and through an aperture 52 in the side beam 22b. Apertures 54 typically extend through the block 18 in a lateral direction 12b. Apertures 54 may have substantially similar dimensions and be arranged in a column extending in a transverse direction 12c. A pin 50a, 50b through the apertures 52, 54 effectively prevents the translation of the mount 19 relative to the base 17.

In the embodiment shown a pin 50a, 50b may also function along with a stud 40 to effectively prevent rotation of the mount 19 relative to the base 17. The extension of the stud 40 into the slot 38 and the presence of a pin 50a, 50b passing through the apertures 52,54 prevents the rotation of the side beams 22a, 22b with respect to the block 18 in the direction 13b (e.g. about a lateral axis 12b).

Figure 3A:
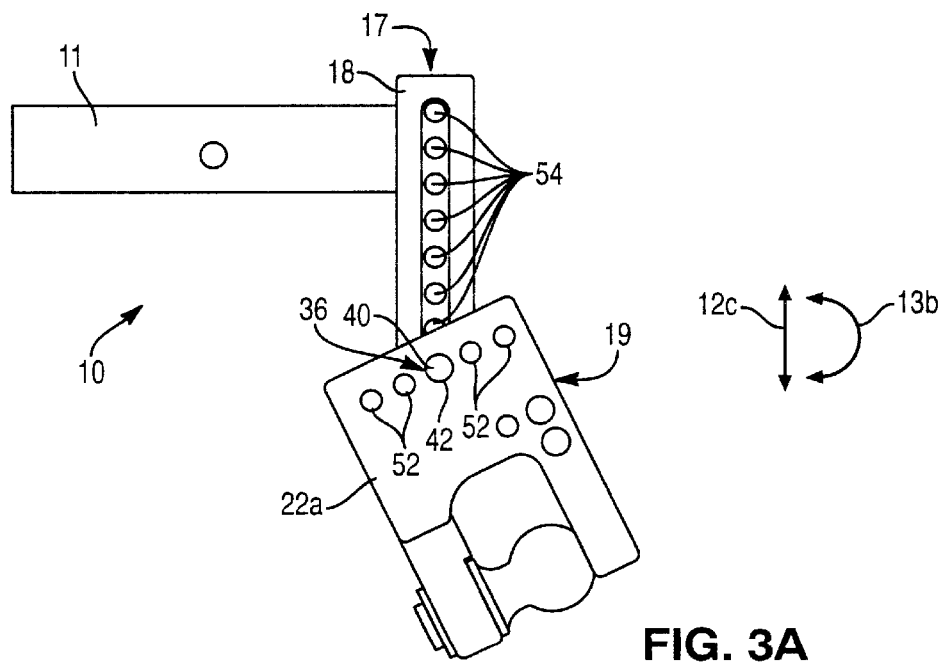
FIG. 3A is a side elevation view of one embodiment of a pintle-hitch mounting mechanism freely rotating about its pivot, in accordance with the invention.
Figure 3B:
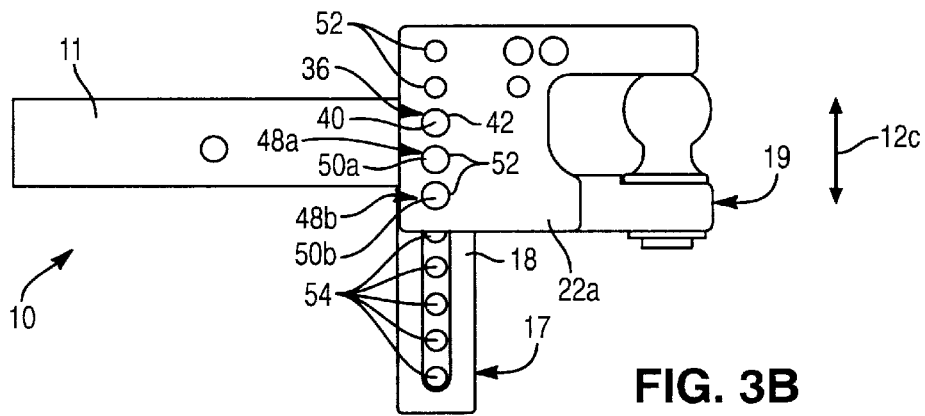
FIG. 3B is a side elevation view of a pintle hitch in a deployed and closed position, in accordance with the invention.
Figure 3C:
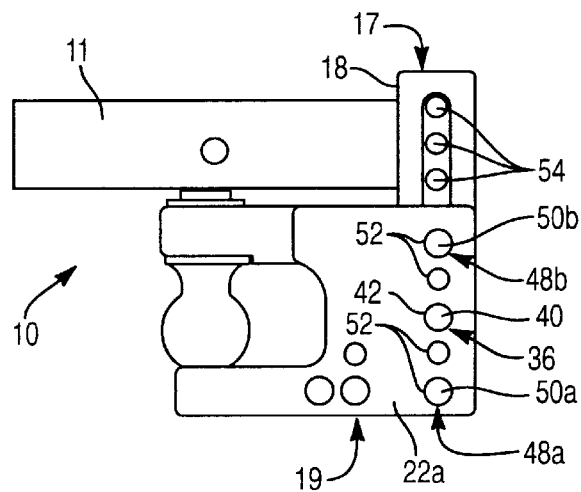
FIG. 3C is a side elevation view of a pintle hitch-mounting mechanism in a deployed and closed position, in accordance with the invention.

Referring to FIGS. 3A–3C, while continuing to refer to FIGS. 1 and 2, a mount 19 may be locked in a variety of positions. With all locks 50a, 50b disengaged, as shown in FIG. 3A, the mount 19 is free to rotate a lateral axis in direction 13b and translate transversely in direction 12c. A lock 48a, 48b or multiple locks 48a, 48b may be used to fix the position and orientation of the mount 19 with respect to the base 17. A pair of apertures 52 located opposite one another in the side beams 22a, 22b may be aligned with an aperture 54. A pin 50a may insert therethrough in order to lock the mount 19 in the position shown in FIG. 3B.

In order to provide greater strength and stability, a second pin 50b may insert into a second, opposite, pair of apertures 52 aligned with a second aperture 54. The possible combinations of opposite pairs of apertures 52 with apertures 54 may correspond to possible heights of the mount 19 relative to the base 17. For example, in FIG. 3B mount 19 is higher, relative to the base, than the mount 19 shown in FIGS. 1 and 2.

By rotating the mount 19 about the pivot 36, the mount may be moved to a stowed position illustrated in FIG. 3C. A pin 50a, 50b may insert through an aperture 52 in the side beam 22a, an aperture 54, and an aperture 52 in the side beam 22b in order to lock the mount 19 in the stowed position. One utility of the stowed position is that the mount does not extend away from the vehicle, eliminating the likelihood of obstruction thereby, tripping users or the like. A user is also spared the risk of forgetting that the apparatus 10 is attached to a vehicle and miscalculating the effective length of the vehicle while parking, risking a minor collision.

Referring to FIGS. 1, 2, 4, 5, and 6, an apparatus 10 may include a pintle assembly 58. A pintle assembly 58 typically closes a loop formed by the mount 19 and the hitch 26, preventing the removal of a pintle ring therefrom. The pintle assembly 58 may include a retainer 60 secured to the mount 19 by means of pivots 62 about which the retainer 60 may rotate about a lateral axis 12b in a rotational direction 13b. The pintle assembly 58 may also include guides 64 along which the retainer 60 may translate relative to the mount 19.

In one embodiment the pivots 62 may be embodied as studs 66 inserted into apertures 68 in side beams 22a, 22b. The studs 66 may be retained in the apertures 68 by means of pins, such as a pin 104 (FIG. 6), inserted into apertures 70.

The guides 64 may be embodied as slots 72 (FIG. 4) or a slot 72 (FIG. 5) having a rearward end 73a, a forward end 73b, and a width 74. A sloth 72 may have a depth 76 (FIG. 4) or may extend through the entire retainer 60 in a lateral direction 12b (FIG. 5b).

The studs 66 may extend through the side beams 22a, 22b and into the slots 72 or single slot 72. In embodiments of the pintle assembly 58 having the retainer 60 of FIG. 4, studs 66 typically extend into the slots 72 a distance no greater than the depth 76. In embodiments of the pintle assembly 58 having the retainer 60 of FIG. 5, the studs 66 may extend partially through the slot 72 or may be embodied as a single stud 66 extending through one aperture 68 in a side beam 22a, through the slot 72, and through a second aperture 68 in a side beam 22b. A stud 66 is typically of suitable dimensions to allow it to rotate and translate substantially freely within a slot 72.

A pintle assembly 58 may also include a lock 78, which may enable a user to fix the position of the retainer 60 with respect to the mount 19. The lock 78 may be embodied as a pin 80. The retainer 60 may be oriented in the position shown in FIG. 1 with the rearward end 73a of the slot 72 or slots 72 aligned with the aperture 82 and the forward end 73b aligned with the aperture 68. A pin 80 may then be inserted through the aperture 82 in side the beam 22a, through the retainer 60, and through the aperture 82 in the side beam 22b in order to lock the retainer 60 in a closed position suitable for retaining a pintle ring as shown in FIG. 1.

Figure 4:
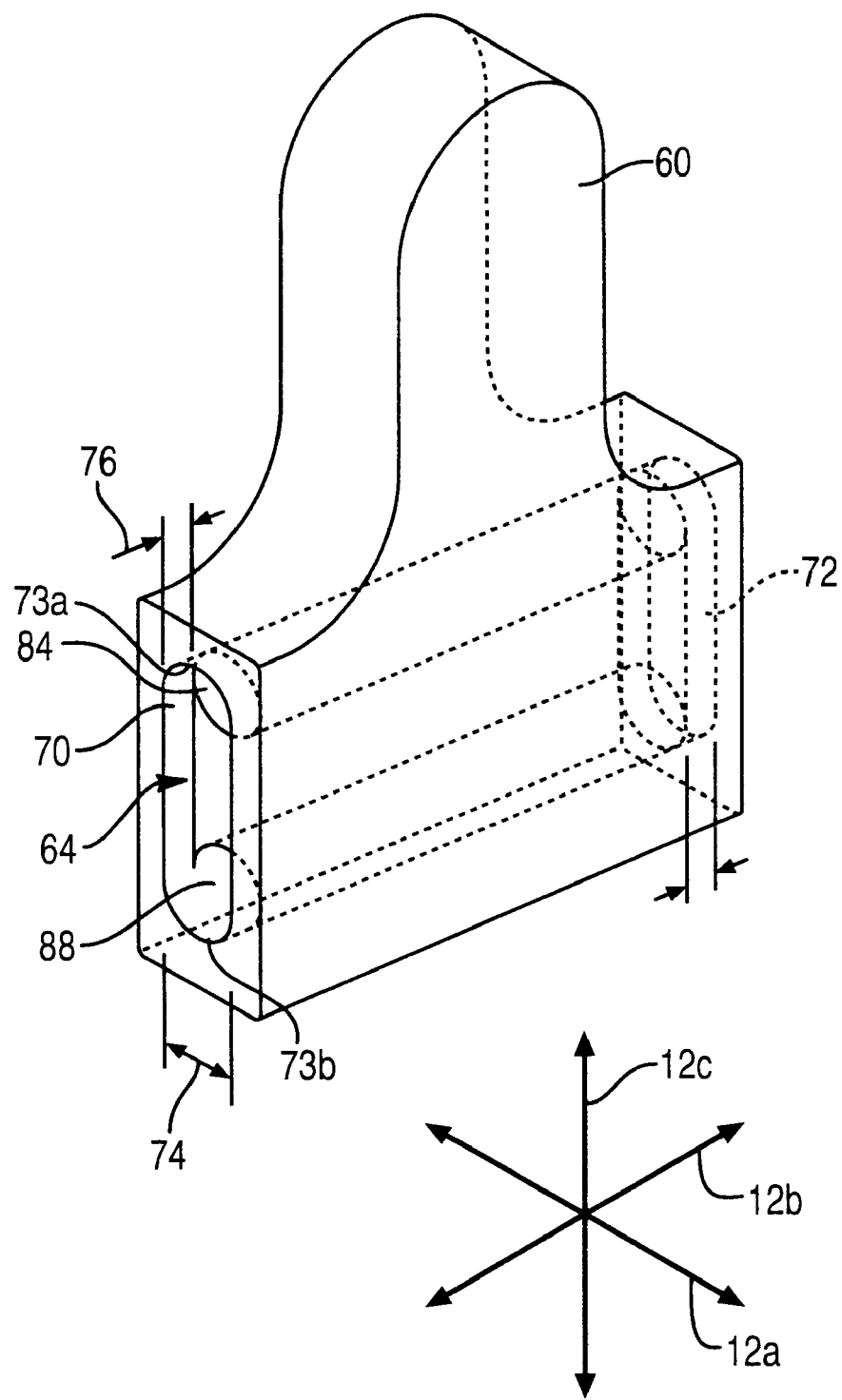
FIG. 4 is a perspective view of one embodiment of a retainer suitable for use in accordance with the invention.
Figure 5:
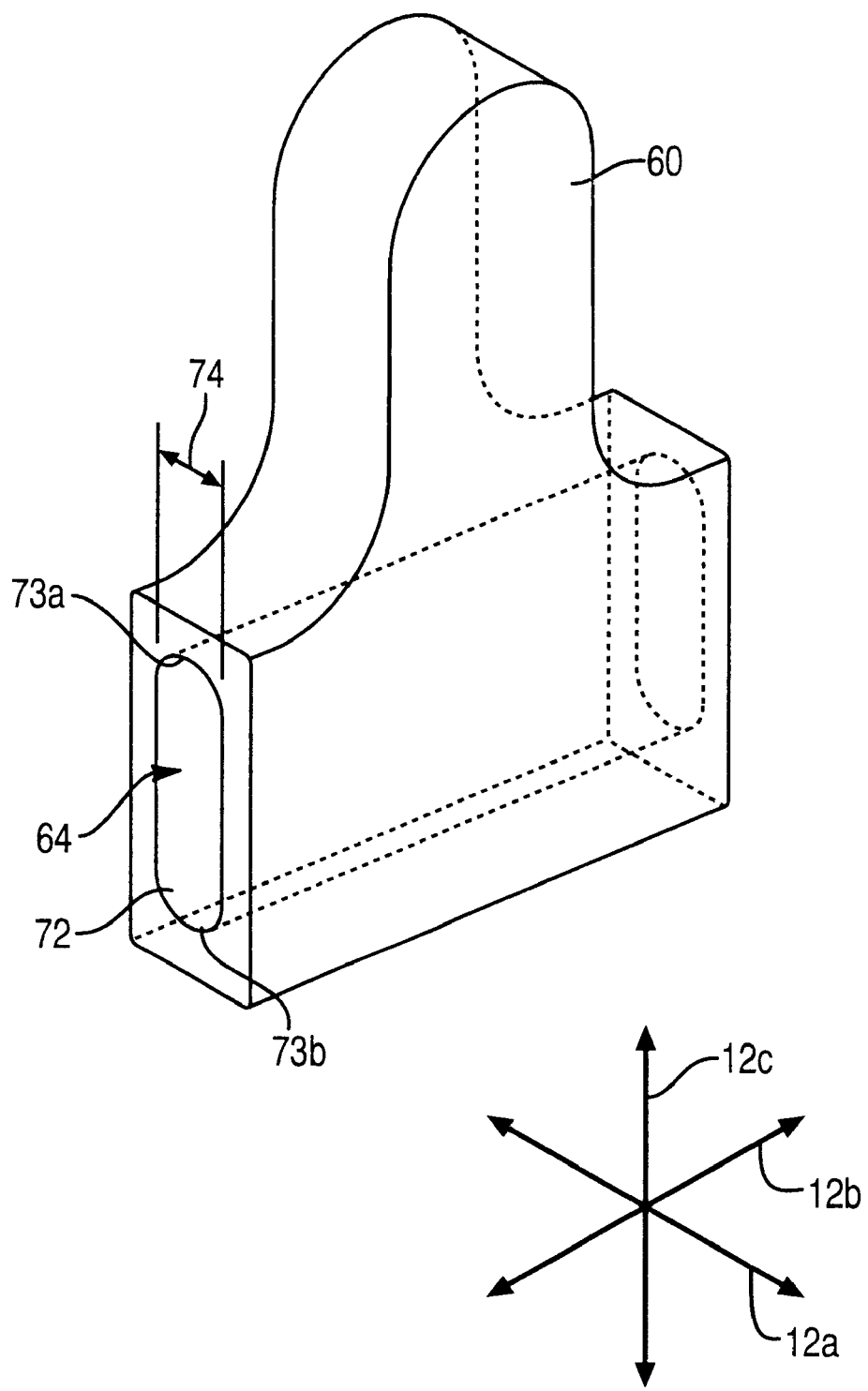
FIG. 5 is a perspective view of another embodiment of a retainer suitable for use in accordance with the invention.

For the retainer 60 shown in FIG. 4 the pin 80 passes through the aperture 84 when the retainer 60 is locked in a closed position. For the retainer 60 shown in FIG. 5 the pin 80 extends through the rearward end 73a of the slot 72 in the closed position.

The rearward end 73a of the slot 72 or slots 72 may be aligned with an aperture 68, such that for the retainer 60 of FIG. 4, the studs 66 extend into slots 72 or, for the retainer of FIG. 5, the stud 66 or studs 66 extend into the rearward end 73a of the slot 72. The forward end 73b of the slot 72 or slots 72 may be aligned with the aperture 86 and a pin 80 inserted therethrough in order to lock the retainer 60 in the open position shown in FIG. 2.

For the retainer 60 shown in FIG. 4, the pin 80 passes through the aperture 88 when the retainer 60 is locked in an open position. For the retainer 60 shown in FIG. 5, the pin 80 extends through the forward end 73b of the slot 72.

With the stud 66 or studs 66 aligned with the rearward end 73a and the retainer oriented in an open position as in FIG. 2, gravity may maintain it in this position and the base 17 may prevent the rotation of the retainer 60 until the retainer 60 is translated in an upward direction.

Accordingly, when a user is securing a trailer to the hitch 26, he or she does not need to insert a locking pin 80 into aperture 86 in order to maintain the retainer 60 out of the way. Interference by the base 17 may likewise prevent translation of the retainer 60 until it has been rotated substantially to the open position of FIG. 2.

Figure 6:
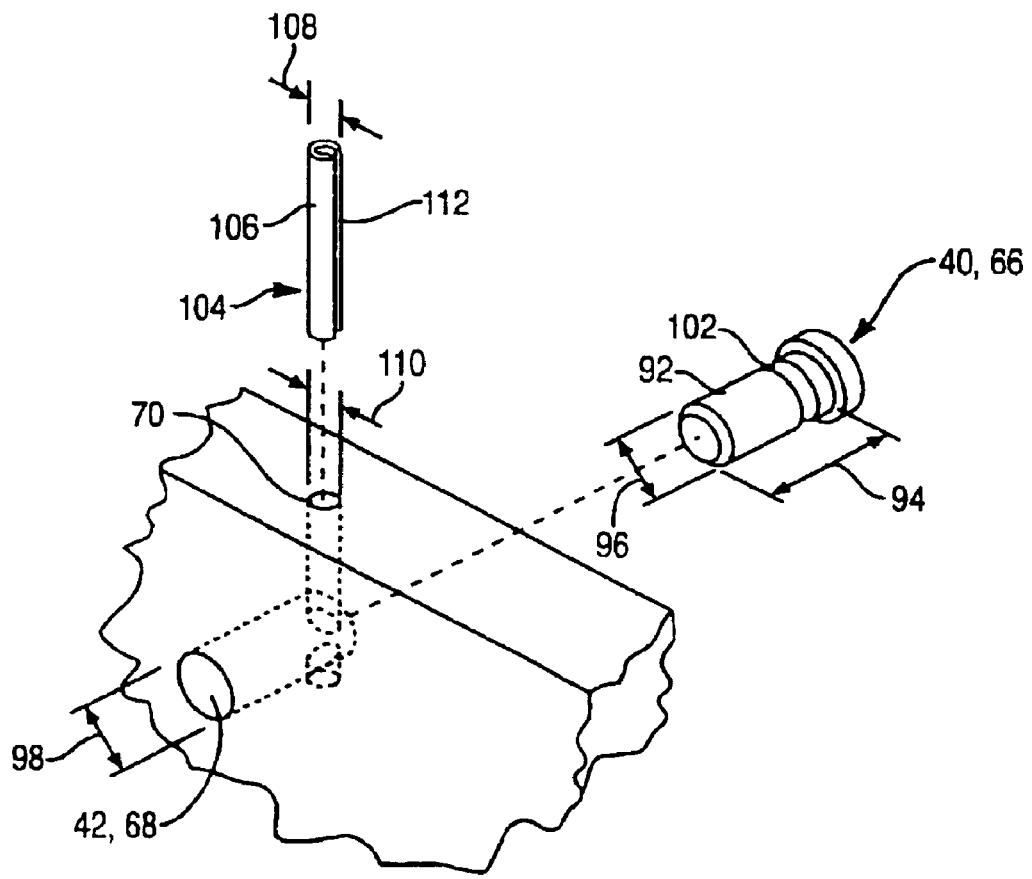
FIG. 6 is an exploded view of a pivot retaining assembly suitable for use in accordance with the invention.

A stud 40, 66 may be embodied as shown in FIG. 6, having a shaft 92 of length 94. A stud 40 or stud 66 used with the retainer 60 of FIG. 4 typically has a length 94 such that the shaft 92 extends through the side beams 22a, 22b and into the slots 38, 72, but not into the apertures 54, 84, 88. A shaft 92 may have a width or diameter 96 sized somewhat smaller than the width 44, 74 of a slot 38, 72 sufficient to allow a shaft 92 to slide an rotate within a slot 38, 72. A stud 40, 66 may secure substantially permanently to the mount 19. One benefit of such a configuration is that the apparatus 10 is easily adjustable, yet the movable parts are theft resistant.

A stud 40, 66 may have a groove 102 such that when the stud 40, 66 is inserted into an aperture 42, 68, a press pin 104 may be inserted into the aperture 70 and engage the groove 102, preventing the removal of the stud 40, 66. A press pin 104 may have a shaft 106 having a diameter 108 slightly larger than the diameter 110 of the aperture 70 or have splines or the like to effect securement. The press pin 104 may have a groove 112 along its length facilitating constriction of the shaft allowing the press pin 104 to be pressed into the aperture 70.

Figure 7:
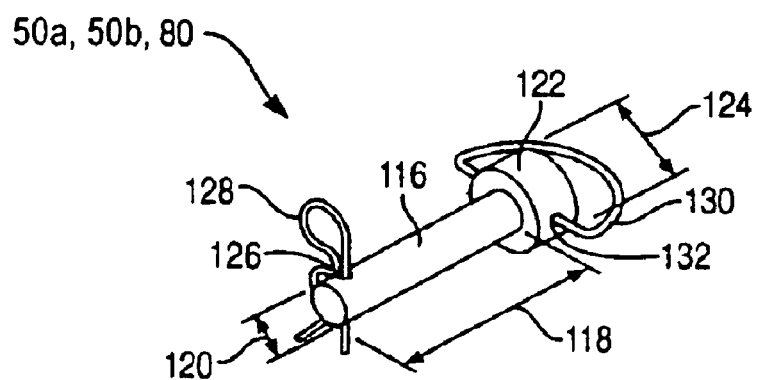
FIG. 7 is a perspective view of a pin suitable for use in accordance with the invention.

A pin 50a, 50b, 80 may be embodied as the pin shown in FIG. 7. The shaft 116 of the pin 50a, 50b, 80 is typically of sufficient length 118 to extend through both cross beams 22a, 22b. The shaft 116 typically has a diameter 120 such that the shaft 116 may be manually inserted through apertures 52, 54, 82, 86. The head 122 typically has a diameter 124 that cannot be inserted through the apertures 52, 54, 82, 86. A pin 50a, 50b, 80 may have an aperture 126 sized to receive a fastener 128, such as a cotter pin or any other suitable fastener. A pin 50a, 50b, 80 may have a handle 130 inserted into an aperture 132, providing for a user to easily grasp the pin 50a, 50b, 80 for removal from the apparatus 10.

Figure 8:
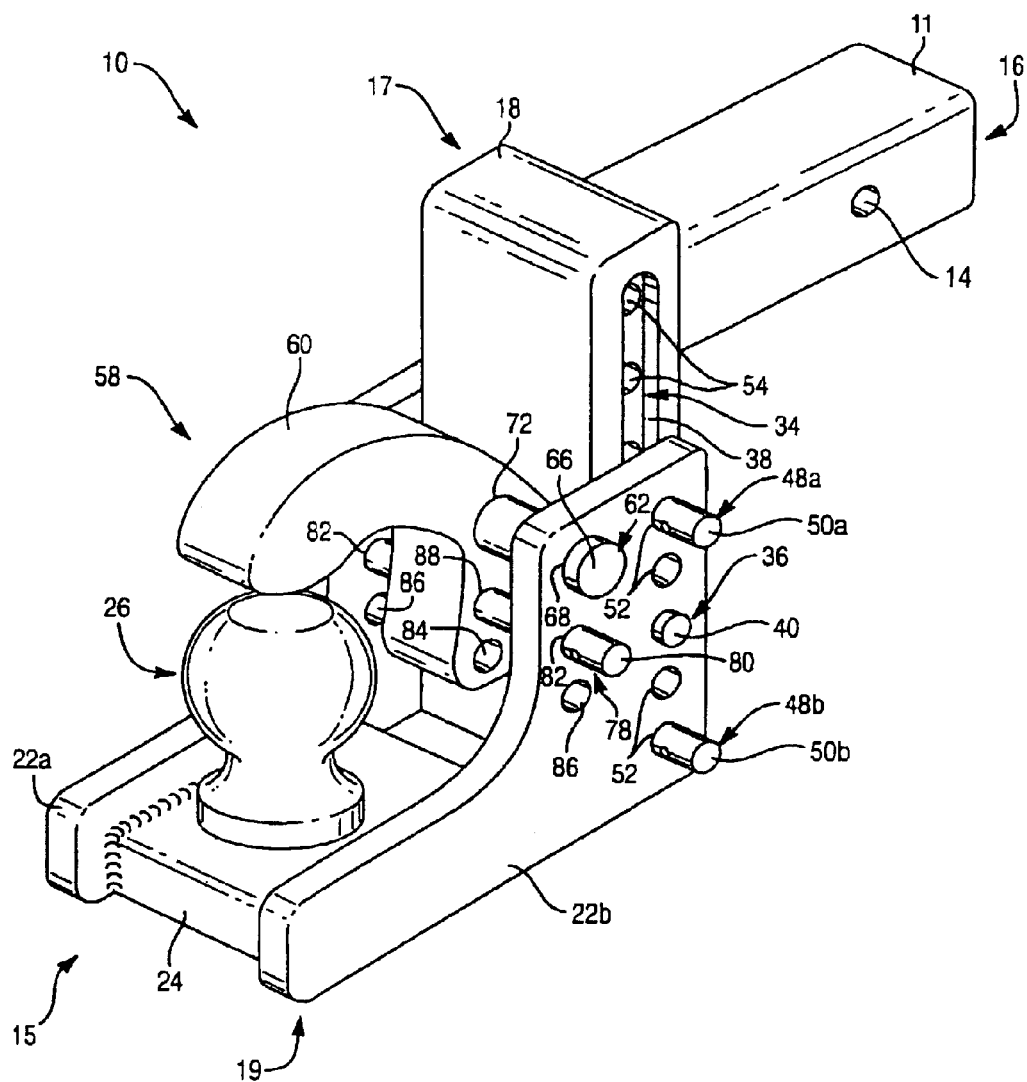
FIG. 8 is a perspective view of another embodiment of a pintle hitch, with the retainer in an open position, in accordance with the invention.
Figure 9:
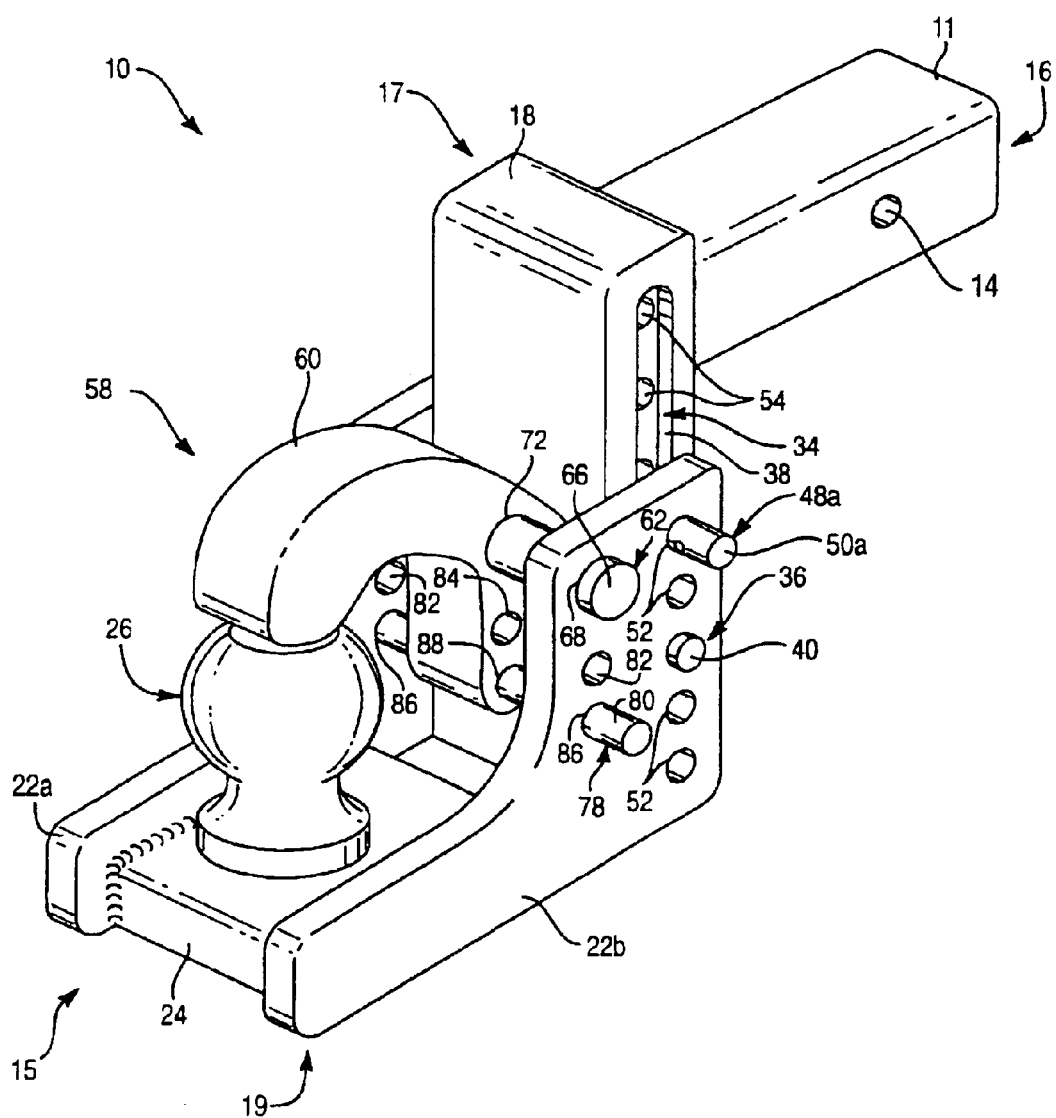
FIG. 9 is a perspective view of another embodiment of a pintle hitch, with the retainer in a closed position, in accordance with the invention.
Figure 10:
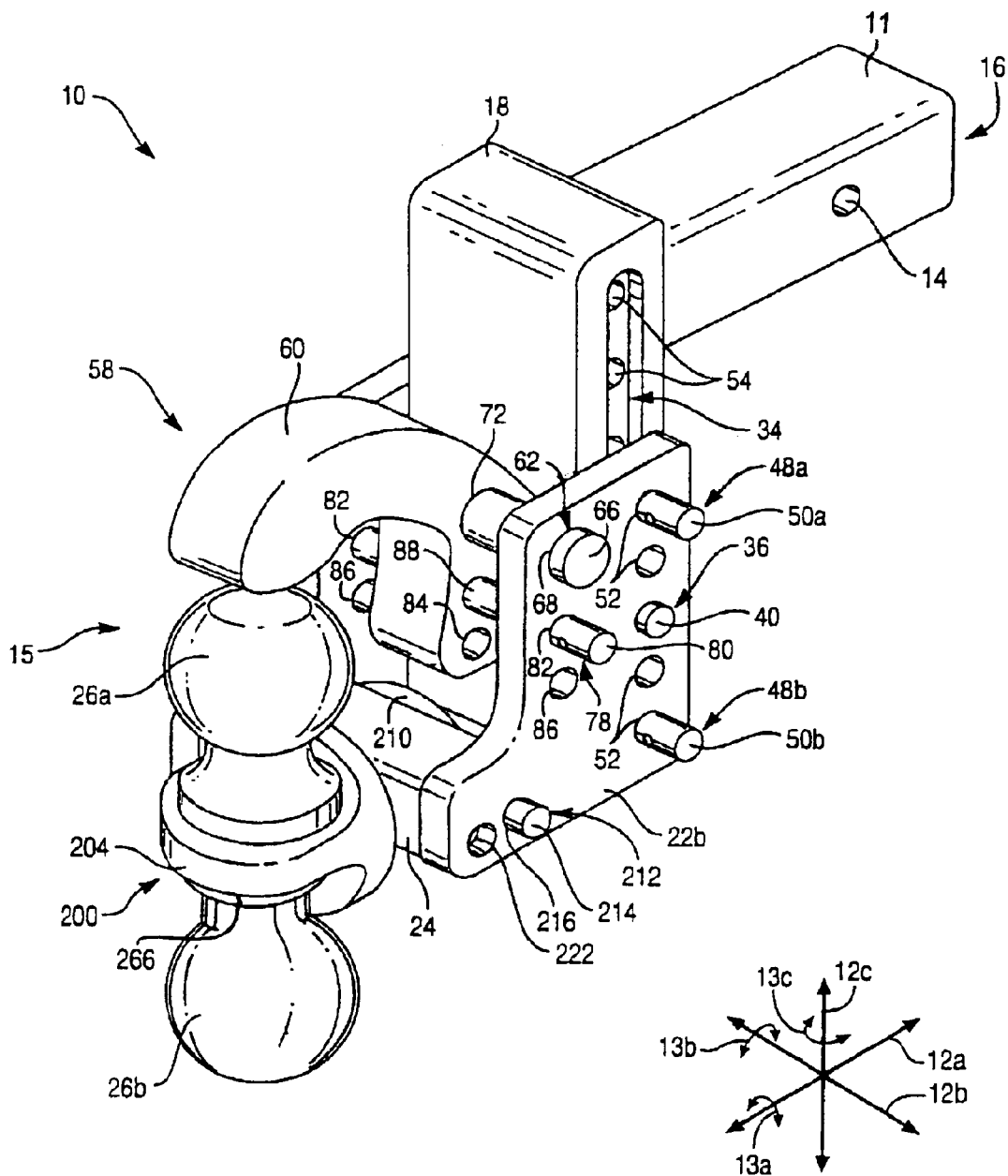
FIG. 10 is a perspective view of the apparatus of FIG. 9 having a lockable turntable carrying two hitches, in accordance with the invention.
Figure 11:
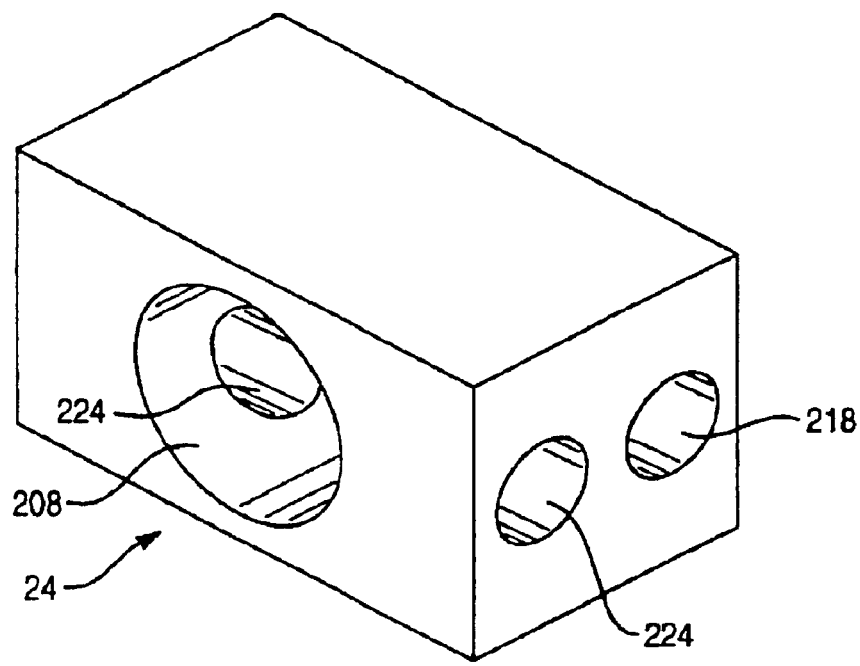
FIG. 11 is a perspective view of a platform suitable for use in the turntable of FIG. 10.
Figure 12:
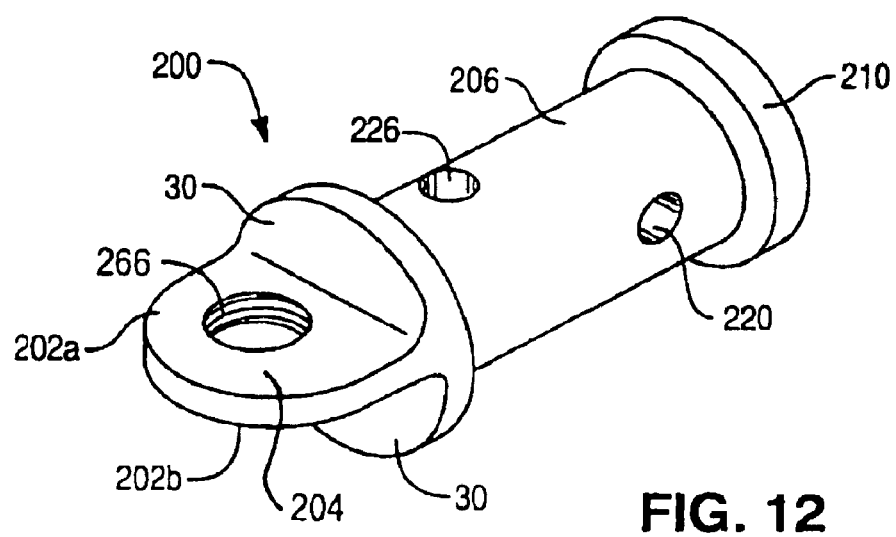
FIG. 12 is a perspective view of a turntable assembly suitable for use in the apparatus of FIGS. 10 and 11.

A pintle assembly 58 may be embodied as shown in FIGS. 8 and 9. The slot 72 may be embodied as an aperture 72 extending through the retainer 60. The retainer 60 may be restricted from translating relative to the pivot 62 in the configuration of FIGS. 8 and 9. The retainer 60 may also be shaped as a hook. The apertures 88 and 84 may be positioned at other locations on the retainer 60, as shown, rather than in a slot 72.

The aperture 88 may be aligned with the aperture 82 and a pin 80 inserted therethrough in order to lock the retainer in an open position as shown in FIG. 8. The open position shown may enable a user attaching a trailer having a ball type trailer attachment to the apparatus 10 to have an extra degree of safety. The retainer 60 will not interfere with the normal operation of the trailer attachment, however, it may prevent the complete detachment of the trailer attachment in the event of failure or improper attachment to the hitch 26. The open position may also permit a user to use a larger sized hitch 26. For a larger sized hitch 26 the open position of FIG. 8 could be considered a closed position with large clearance. The aperture 84 may be aligned with the apertures 86 in the side beams 22a, 22b and a pin inserted therethrough in order to lock the retainer 60 in a closed position shown in FIG. 9.

Referring to FIGS. 10–13, the apparatus 10 may comprise a turntable assembly 200 having one or more hitches mounted on a turntable 204 having one or more surfaces 202a, 202b. The surfaces 202a, 202b may have an aperture 266 therethrough sized to receive a stud or bolt 27 used for mounting a hitch 26. The turntable assembly 200 may be mounted in the platform 24 in a manner allowing the turntable assembly 200 to rotate relative to the platform 24. The turntable assembly 200 may connect to or be fabricated to have a shaft 206 inserted into an aperture 208 of the platform 24. The shaft 206 and aperture 208 are typically sized such that the shaft 206 may rotate within the aperture 208.

The shaft 206 may receive a retainer 210 securing the shaft 206 against removal from the aperture 208. Some embodiments of the apparatus 10 in accordance with the invention may have multiple hitches 26a, 26b which may rest on surfaces 202a, 202b. The turntable assembly 200 may, accordingly, rotate in a direction 13a in order to orient a particular hitch 26a, 26b properly for towing. For example, in FIG. 10, the hitch 26a is oriented suitably for attaching to a conventional trailer tongue attachment mechanism. The turntable assembly 200 could be rotated 180 degrees in order to orient hitch 26b suitably for attaching to a conventional trailer tongue attachment mechanism.

The apparatus 10 may include a lock 212, which enables a user to prevent rotation of the turntable assembly 200. The lock 212 may comprise a pin 214, which may insert into an aperture 216 in the side beam 22a, aperture 218 in the platform 24, aperture 220 in the shaft 206, and an aperture 216 in the side beam 22b in order to lock the turntable assembly 200 in deployed positions (i.e. either hitch 26a or 26b oriented suitably for attachment to a conventional trailer attachment). The pin 214 may be inserted through an aperture 222 in the side beam 22a, aperture 224 in the platform 24, aperture 226 in shaft 206, and an aperture 222 in the side beam 22b in order to lock the turntable assembly 200 in a stowed position. The hitches 26a, 26b may be a quarter revolution in direction 13a from the position shown in FIG. 10. The stowed position allows the mount 19 to be oriented as shown in FIG. 3C without a hitch 26a, 26b interfering with the trunnion 11.

Figure 13:
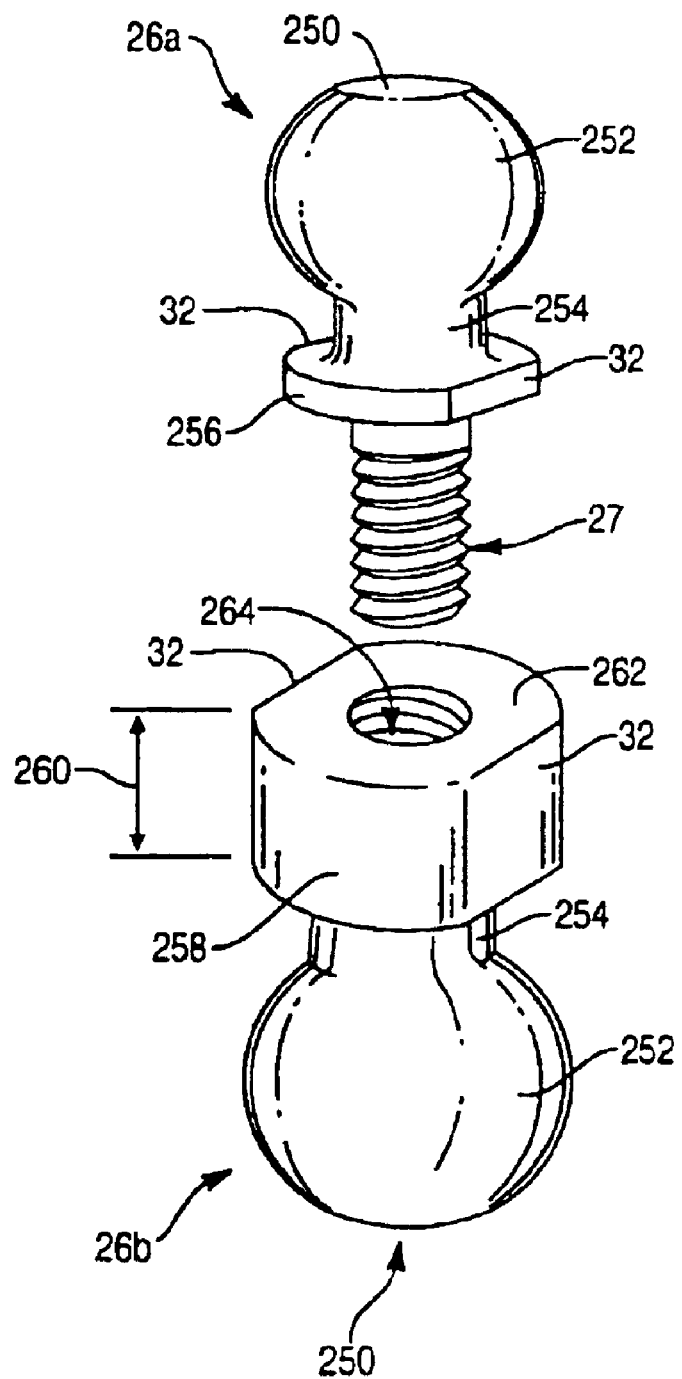
FIG. 13 is a perspective view of a multiple hitch assembly suitable for use in the apparatus of FIGS. 10–12.

Referring to FIG. 13, a hitch 26a, 26b may include surfaces such as flat surfaces 32 configured to receive a wrench for controlling rotation of the hitch 26a, 26b during securement to a supporting surface. Also, a flat surface 250 on the hitch 26a, 26b may provide space for a label identifying the load rating and other significant information about the hitch 26a, 26b. A hitch 26a, 26b may also include a ball 252 supported by a neck 254 having a flange or base 256.

A stud 27 may typically be integrally formed with the ball 252, neck 254, and flange or base 256. The stud 27 may secure the hitch 26a, 26b to a suitable platform 24 or surface 202a, 202b for towing. In certain embodiments, the stud 27 and neck 254 may be of approximately the same size in order to provide equal strength and to reduce stress concentrations that otherwise occur with substantial changes in cross section.

A hitch 26b may have a pedestal 258 having a height 260 significantly larger than that of the base 256 of hitch 26a. The base 256 acts primarily to register the hitch 26a, 26b and stud 27 with respect to a supporting mount 19, while also supporting a loading couple occasioned by radial loads on the hitch 26a, 26b. The hitch 26b is supported by a shoulder 262 adapted to fit against a mounting surface of a suitable mount (e.g. platform 24, or surfaces 202a, 202b) for holding the first hitch 26a and hitch 26b bolted together by the stud 27. The shoulder 262 supports axial and bending loading on the hitch 26b.

Wrench flats upon flat surfaces 32 on the pedestal 258 are sized and shaped to receive a wrench for preventing rotation of the hitch 26a, 26b in a circumferential direction during installation or removal from a platform 24 or surface 202a, 202b. Also, a flat surface 250 for a label may be imprinted with a load rating or other significant information associated with the ball hitch 252.

Unlike the flange or base 256 of the hitch 26b, the pedestal 258 need not have a stud 27 formed to receive a nut 28 for securement to a mount 19. Instead, the pedestal 258 may be formed to have a length 260 for receiving a substantial portion of the stud 27. Accordingly, a threaded aperture 264 may receive a threaded stud 27. A lock washer (not shown) may be interposed between shoulder 262 and the surface 202b to prevent loosening of the hitches 26a, 26b due to vibration.

The pedestal 258 is formed to have a cross-sectional area effective to support the stresses imposed by engagement of the threads of the threaded aperture 264 and stud 27. The cross-sectional area of the pedestal 258 is sufficient to distribute stresses between the stud 27 and the neck 254 of hitch 26b, without radical changes in axial cross-sectional area. For example, the neck 254 cannot simply be bored to have an aperture 264 and still maintain all of its structural integrity. Such an undermining of the neck 254 severely restricts the load rating for which the hitch 26b could be rated.

Instead, the continuity of material and stress distributions extends from the neck 254 of hitch 26a through the stud 27 to the pedestal 258 and neck 254 of hitch 26b. Thus, the hitch 26a and hitch 26b may be supported at their fully rated load, as if each were a single ball hitch having its own original rating in accordance with its size and conventional standard.

Figure 14:
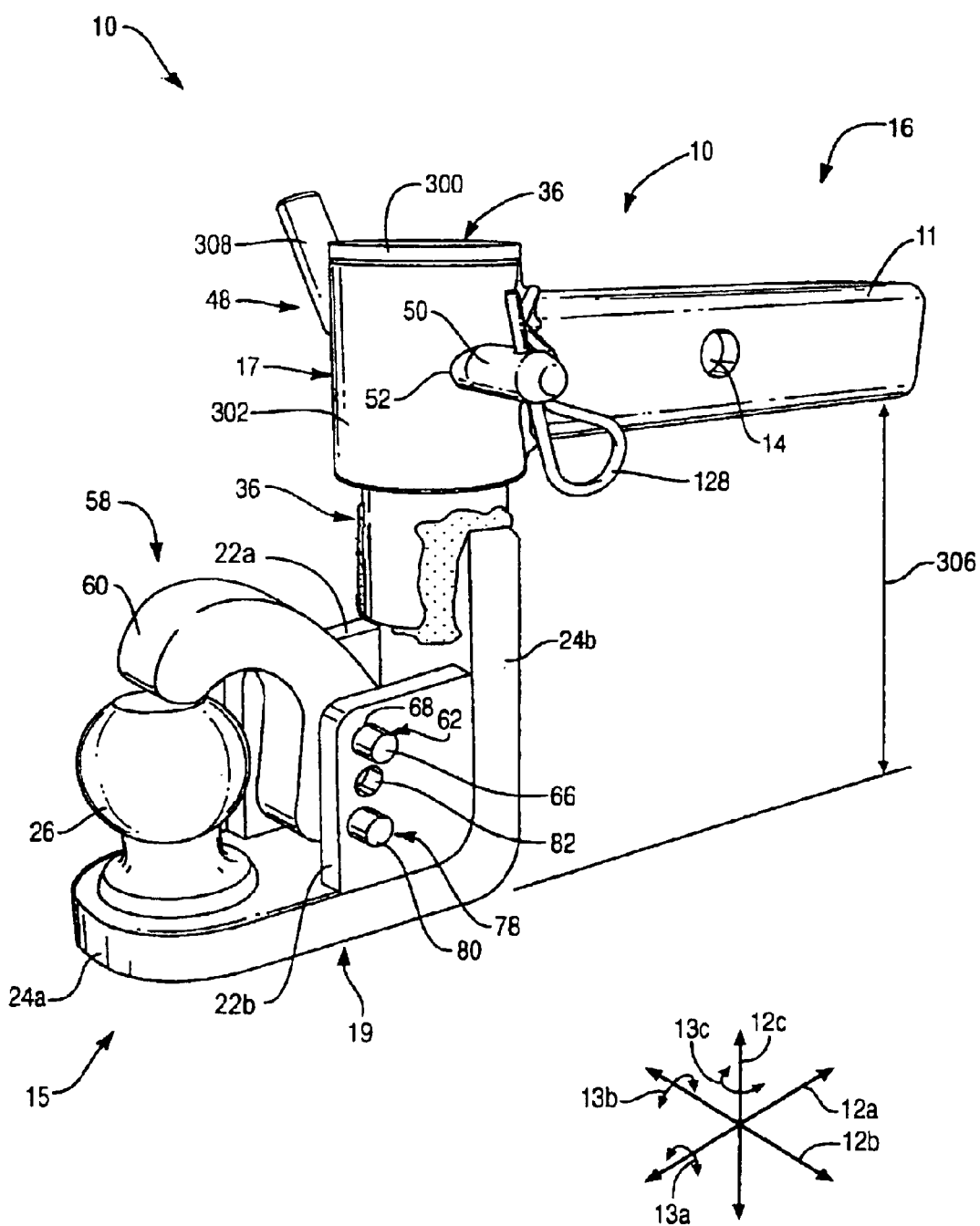
FIG. 14 is a perspective view of an alternative embodiment of a pivoting mount in accordance with the invention.

Referring to FIG. 14, while continuing to refer generally to FIGS. 1–12, the apparatus 10 may include a base 17 that is not rectangular. For example, the pivot 36 securing the mount 19 to the base 17 and trunnion 11, may itself be cylindrical. The mount 19 may have a lock 48 that uses or relies upon a single aperture 52.

The hitch 26 may still be selectively positioned between a stowed position and a deployed position by rotating a mount 19 about the pivot 36. The pivot 36, however, may rely on a pin or stud 40 having more functions in certain alternative embodiments. For example, the stud 40 may support the loads in all directions 12a–12c.

The concept of a cotter pin or keeper used as fastener 128 may still be relied upon. Likewise, a head 300 on the pivot 36 (the pivot stud 40 being a specific embodiment thereof) may support a load in a transverse direction 12c, rather than providing retainage in a lateral direction 12b. Nevertheless, as a practical matter, a pin 50 may support loads in the transverse direction 12c depending upon the design of clearances between the head 300 and the cylinder 302 of the base 17. Likewise the clearance between the pin 50 and the aperture 52 through the cylinder 302, and the stud 40 may be significant.

For convenience, any of the pins or studs 50, 66, 80 may include a handle 308 for manipulation. When tolerances or clearances are tight, some rotation of a pin 50, 80 may be beneficial in order to more easily remove or insert the pin 50, 80. An additional point concerning the head 300, of the stud 40 is that the head 300 may be either removable or integral therewith. Since the locking pin 50 actually secures the position of the pivot 36, no great risk is presented by the head 300 being threaded or otherwise secured to the stud 40, rather than being secured monolithically. Thus, the stud 40 may be replaceable by one of different length (e.g. height) to provide a desired offset 306 in various embodiments of the apparatus 10 manufactured or sold.

Figure 15:
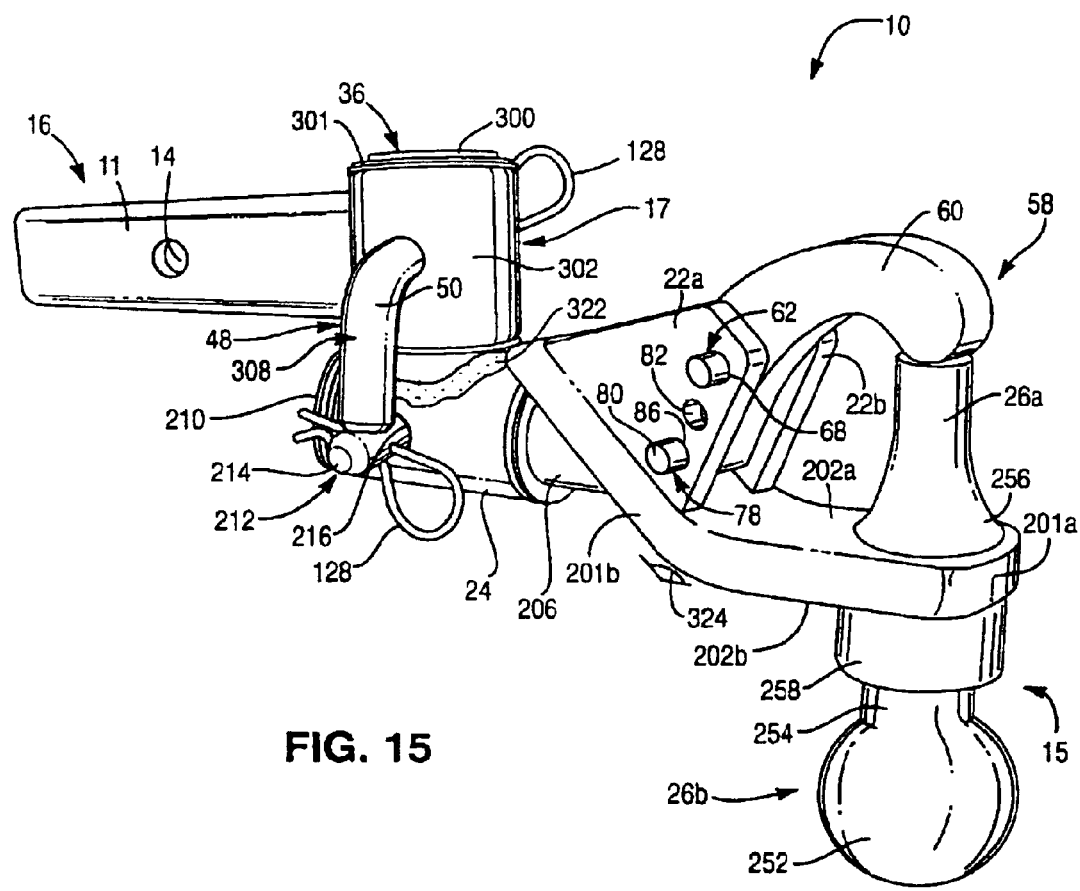
FIG. 15 is a perspective view of another alternative embodiment of a pivoting mount in accordance with the invention.
Figure 16:
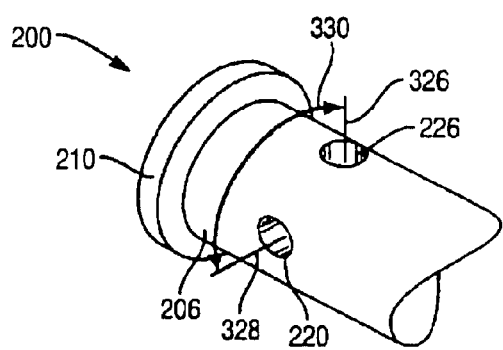
FIG. 16 is a perspective view of part of an alternative aperture configuration for a turntable assembly.

Referring to FIGS. 15 and 16, while referring generally to FIGS. 10–13, an apparatus 10 may have a base 17 shaped as a cylinder 302, as described in FIG. 13. In addition the stud 40 may be prevented from moving in the downward vertical direction by a snap ring 301. The apparatus 10 may also include a turntable assembly 200 as described in FIGS. 10–13. In some embodiments the platform 24 may be shaped as a cylinder attached to stud 40 by means of a weld 322 or some other suitable means of attachment. The turntable 204 may comprise two legs 201a and 201b oriented at an angle 324 relative to one another with one leg 201b secured to the shaft 206. The apertures 220 and 226 (FIG. 16) may be positioned such that their axes 326 and 328 are co-planer and oriented at an angle 330 from each other. The angle 330 is typically about 90 degrees. For a turntable assembly 200 having the configuration of FIG. 16, cylinder 24 may operate with a single aperture 218 extending therethrough rather than two apertures 218, 224.

Figure 17:
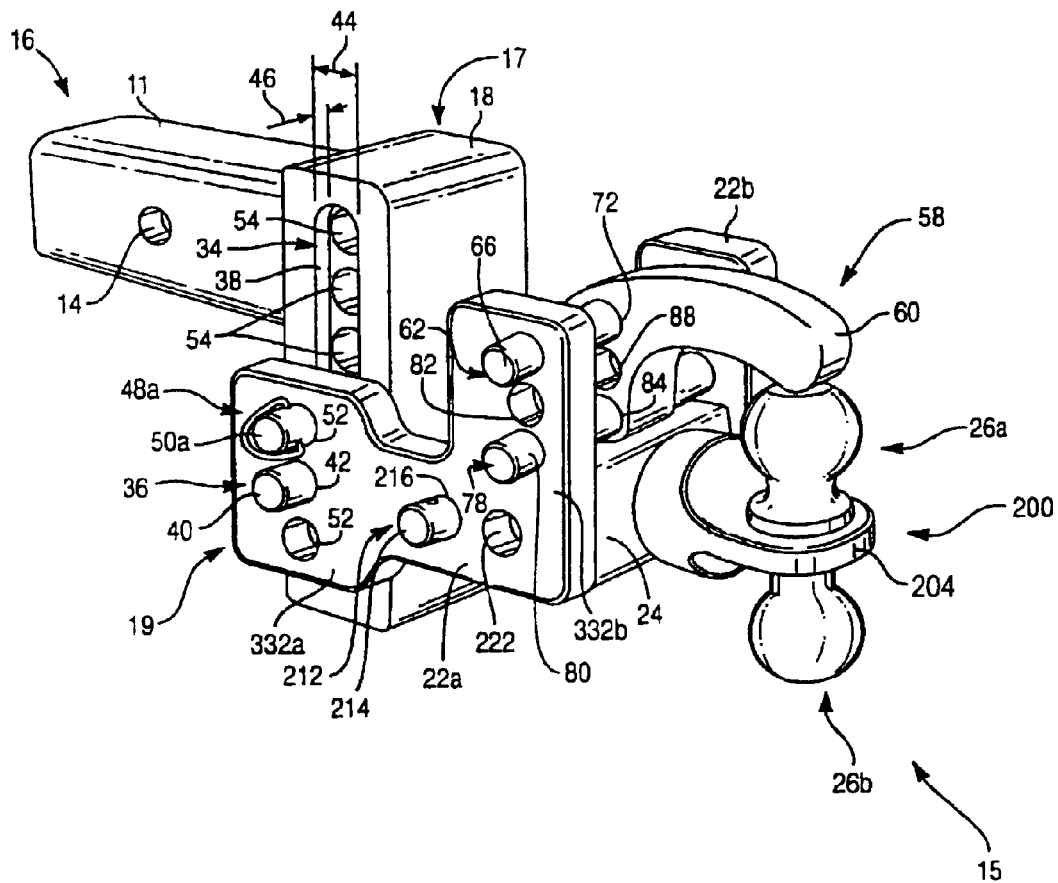
FIG. 17 is a perspective view of an alternative embodiment of the apparatus of FIG. 10.
Figure 17:
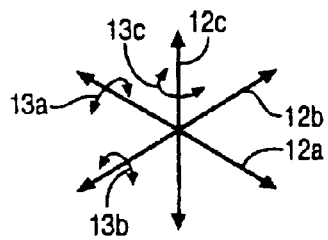

Referring to FIG. 17, an apparatus 10 may have a mount 19 having side beams 22a, 22b having an alternative configuration. For example, beams 22a, 22b may have an "L" shape with one arm 332a secured to the base 17, and another arm 332b secured to the pintle assembly 58 and platform 24. Such a configuration may provide a more lightweight mount requiring less material.

Figure 18:
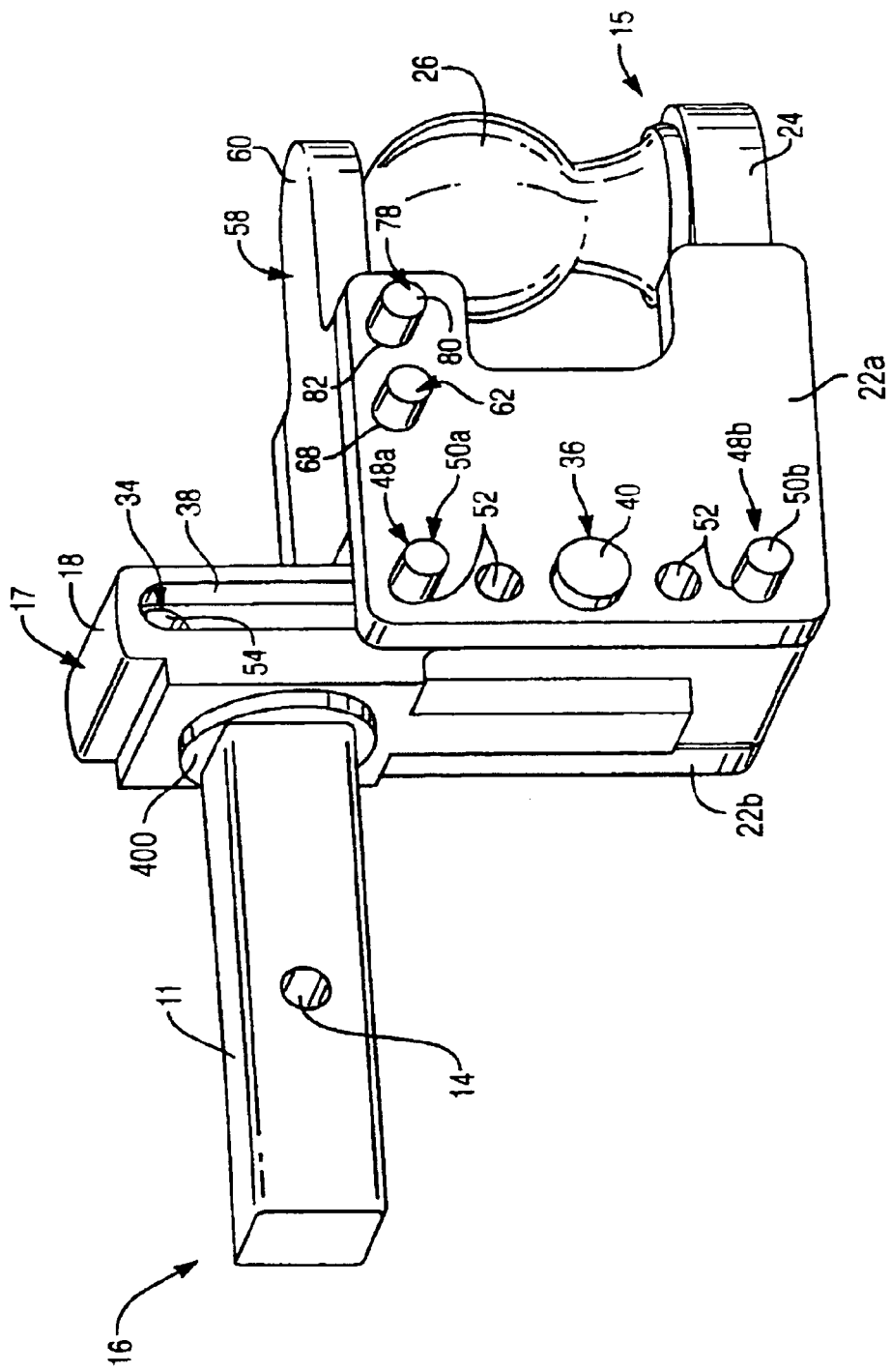
FIG. 18 is a perspective view of an apparatus having a base selectively swiveling with respect to the trunnion, in accordance with the invention.
Figure 19:
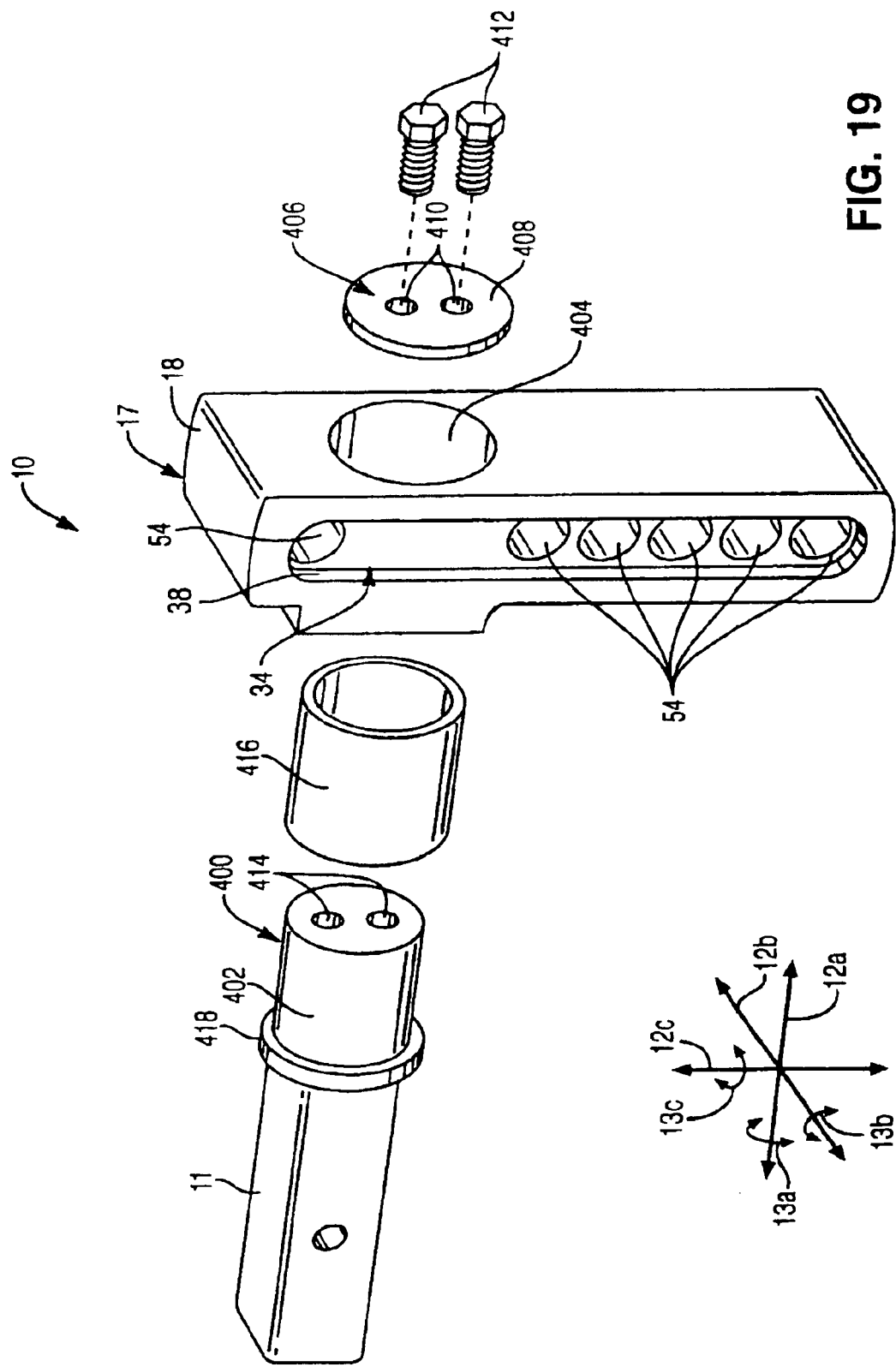
FIG. 19 is an exploded view of the apparatus of FIG. 18.

Referring to FIGS. 18 and 19, a mount 19 may be secured to a trunnion 11 by a pivot 400, allowing the mount to rotate in a rotational direction 13a while towing a vehicle. This may be useful when towing vehicles on rocky terrain. In such circumstances the difference in orientations of the vehicle and trailer can exceed the rotational limits or constraints of an ordinary hitch system. Allowing the mount 19 to freely rotate accommodates the rotation of the trailer about a longitudinal axis 12a relative to the vehicle without interference.

The pivot 400 may be embodied as a shaft 402 attached to the trunnion 11 or formed as an integral, or even homogeneous, part thereof. The shaft 402 may pass through an aperture 404 in the base 17. A retainer 406 may prevent removal of the base 17 from the pivot 400. The retainer 406 may be embodied as a plate 408 having apertures 410. Fasteners 412 may be inserted through the apertures 410 and into the apertures 414 in the pivot 400. Apertures 414 may be threaded such that the fasteners 412 may be embodied as bolts, which may be screwed into the apertures 414. The apparatus 10 may have a bushing 416 to help facilitate rotation and resist abrasion of the bearing surfaces. The shaft 402 may also have a restraint 418, such as a key, pin, stud, or shoulder, or other limiter to restrain movement of the mount 19 in the longitudinal direction 12a.

Figure 20:
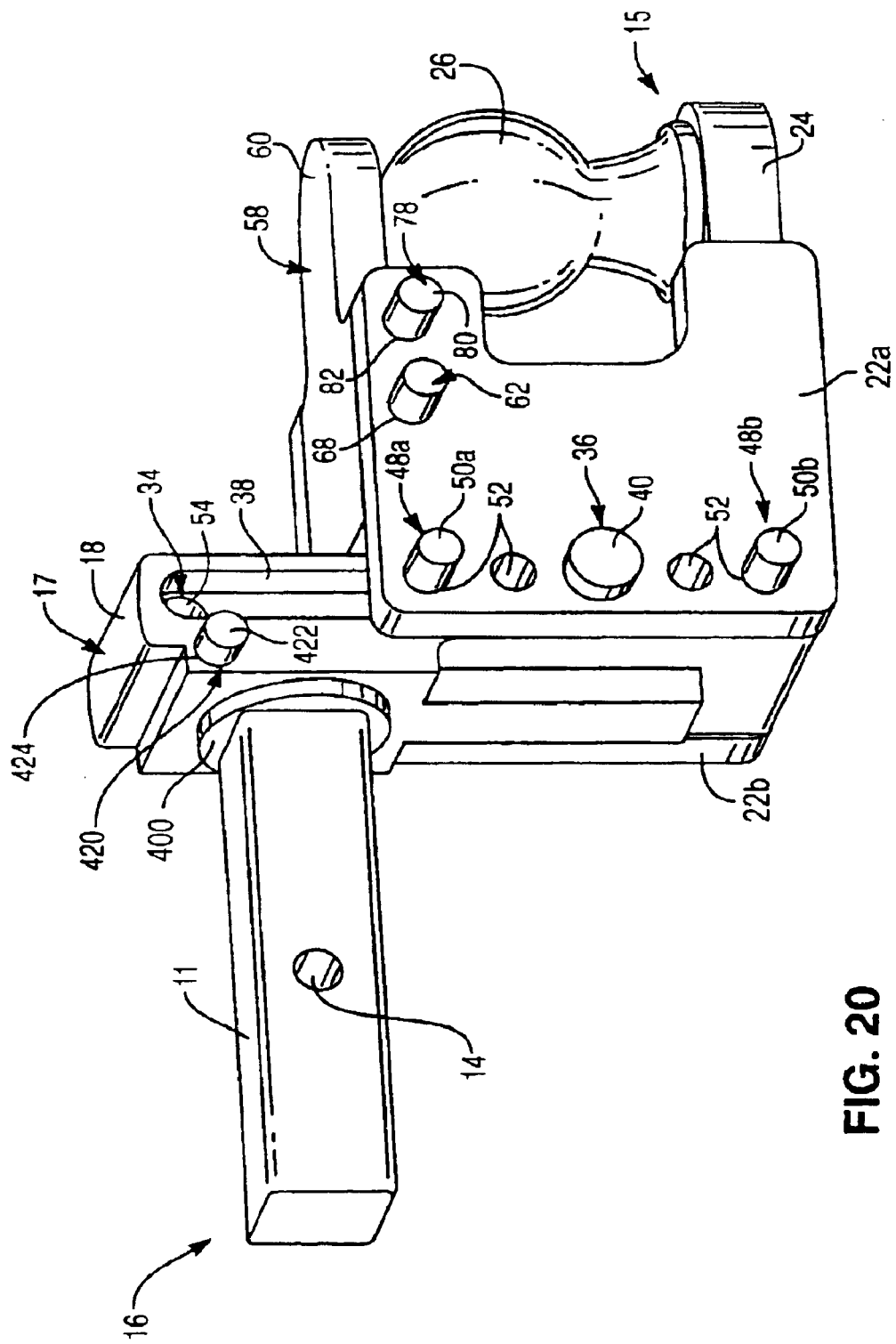
FIG. 20 is an alternative embodiment of the apparatus of FIG. 18.
Figure 21:
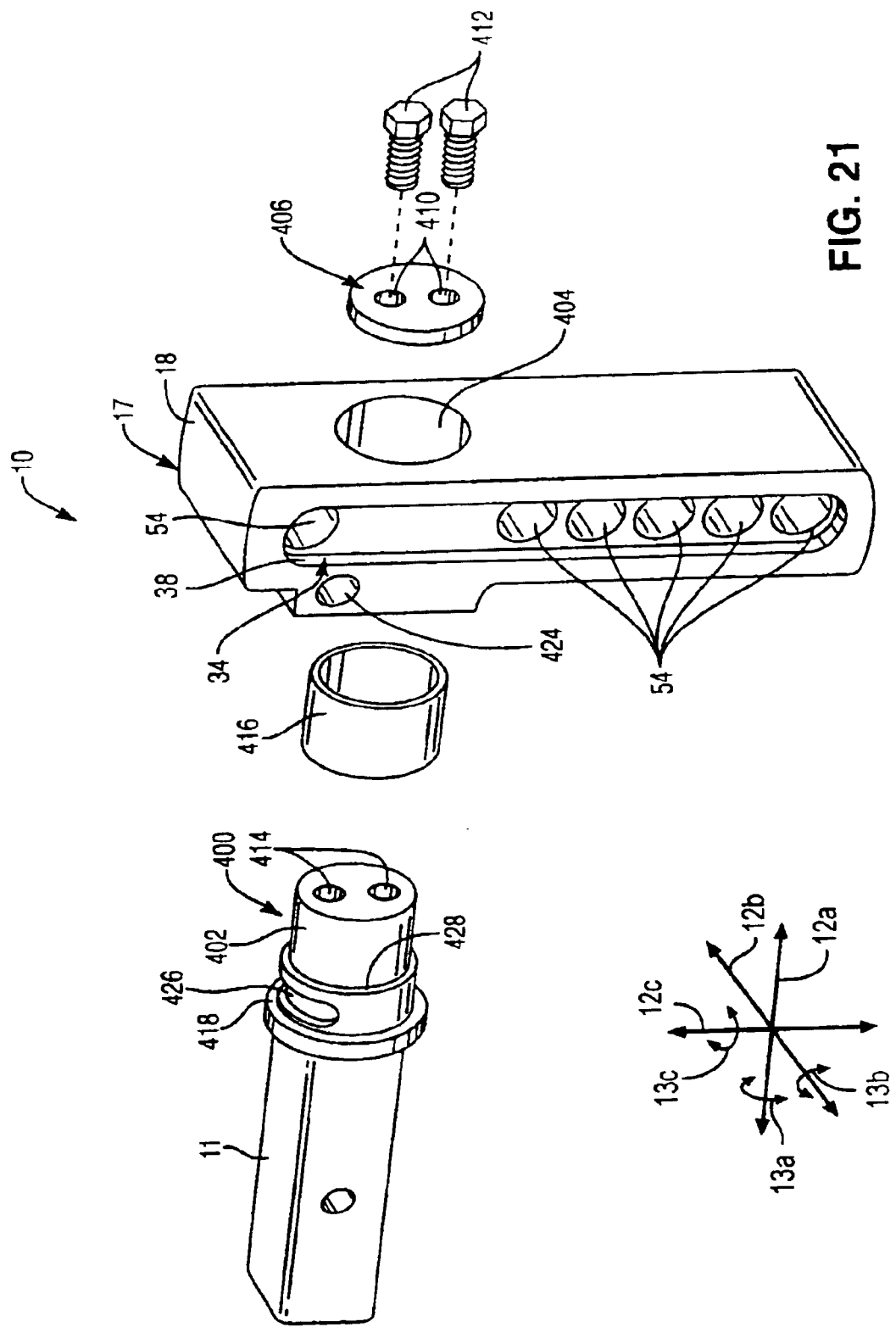
FIG. 21 is an exploded view of the apparatus of FIG. 20.

Referring to FIGS. 20 and 21, an alternative embodiment of the apparatus of FIGS. 18 and 19 may have a lock 420 allowing a user to restrict the rotation of the mount 19 about a longitudinal axis 12a relative to the trunnion 11. The lock 420 may be embodied as a pin 422 inserted through the aperture 424 in the base 17 and engaging a groove 426 formed in the shaft 402. A retainer 428 such as a snap ring 428, stud 428, key 428, pin 428, or shoulder 428 may also be formed in the shaft 402 to retain the bushing 416, preventing it from sliding over the groove 426.

Figure 22:
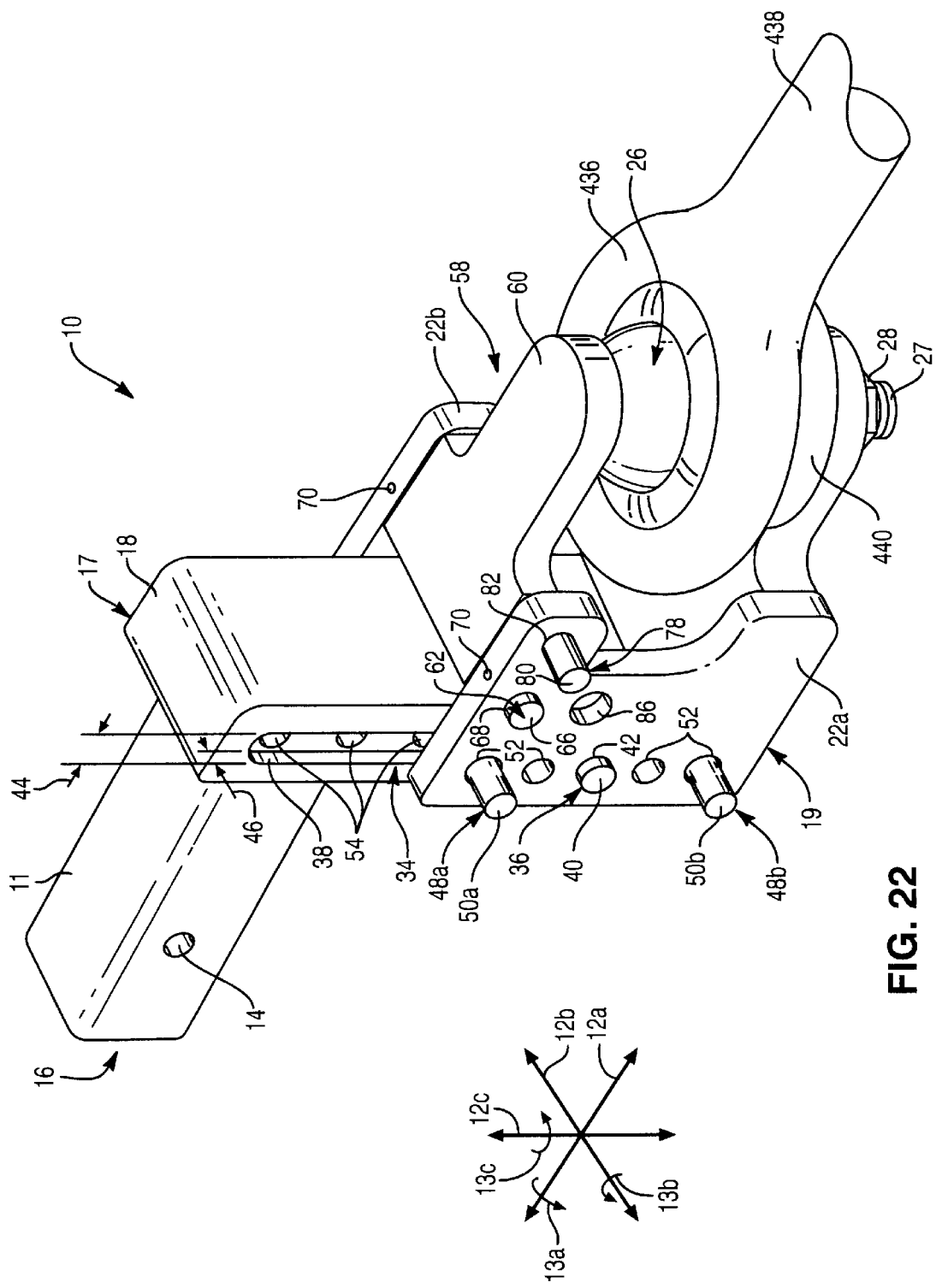
FIG. 22 is a perspective view of an apparatus employing a silencing spacer (e.g. bumper or buffer) in accordance with the invention.

Referring to FIG. 22, a pintle ring 436 attached to an extension 438 may be used to secure a trailer tongue to a hitch 26. Relative movement between the hitch 26 and the pintle ring 436 can cause several problems. For example, a towing vehicle may accelerate a certain amount before the hitch 26 transfers motion to the towing load. When the slack is taken up and the transfer of force is made, it may be made through an impact event. Even for small distances and accelerations, impact loadings between a hitch 26 and a pintle ring 436 may be large enough to break components of an apparatus 10. Localized stresses can deform and abraid components. Additionally, this movement and impact may be noisy, cause excessive wear, and cause control problems.

A spacer or silencer 440 may be fitted to the hitch 26 or a pintle ring 436 to fill the space between the hitch 26 and the pintle ring 436. The spacer 440 may transfer force between a hitch 26 and a pintle ring 436 before the relative velocity between the vehicle and trailer becomes excessive. By filling the space between the hitch 26 and the pintle ring 436, a spacer 440 ensures that force will be transferred between the hitch 26 and the pintle ring 436 as they begin to accelerate relative to one another. The spacer 440 may provide shock absorption to reduce the impulse or force of impacts. The spacer 440 may be constructed of a material that is wear resistant.

Figure 23:
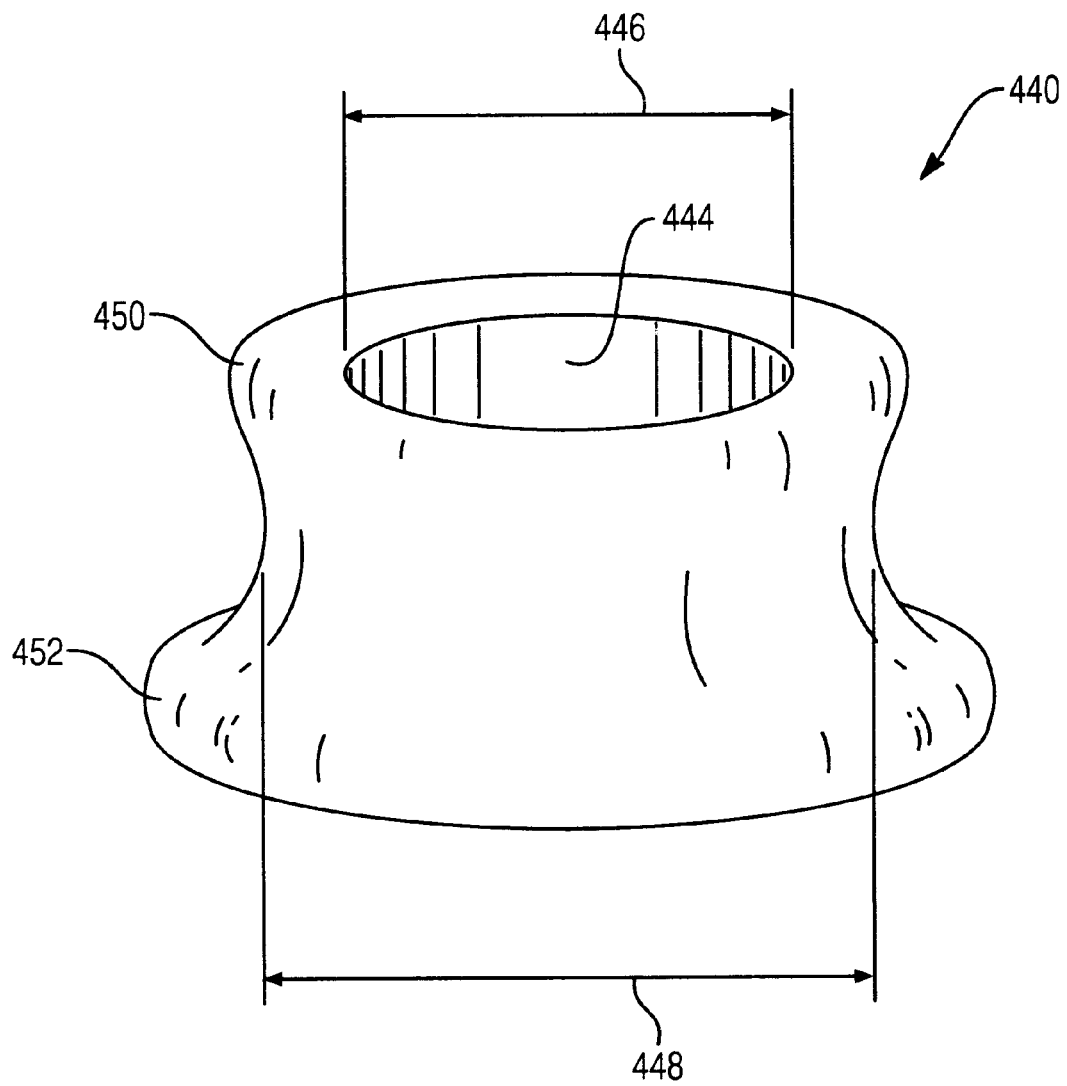
FIG. 23 is a perspective view of a silencing spacer suitable for securing to a hitch in accordance with the invention.

Referring to FIG. 23, a spacer 440 may have an aperture 444 having a diameter 446 sized to enable the spacer 440 to fit around a hitch 26. In such an embodiment, the spacer 440 may be formed of a resilient (e.g. elastomeric)material having the ability to stretch, deform, and return allowing it to be slipped on manually and then fit snugly, and evenly grip. In an alternative embodiment, the spacer 440 may be formed directly onto a hitch 26. For example, the spacer 440 may be injection molded directly onto the hitch 26. This may be helpful with stiff or less resilient material.

The spacer 440 may have an outside diameter 448 sized to allow a pintle ring 436 to be placed around the spacer 440. The spacer 440 may have a lip 450 sufficiently compliant to allow the pintle ring 436 to pass thereover yet still provide a retaining force resisting the removal of the pintle ring 436. The spacer 440 may have a base 452 extending below a pintle ring 436 providing a cushion between the pintle ring 436 and the platform 24.

Figure 24:
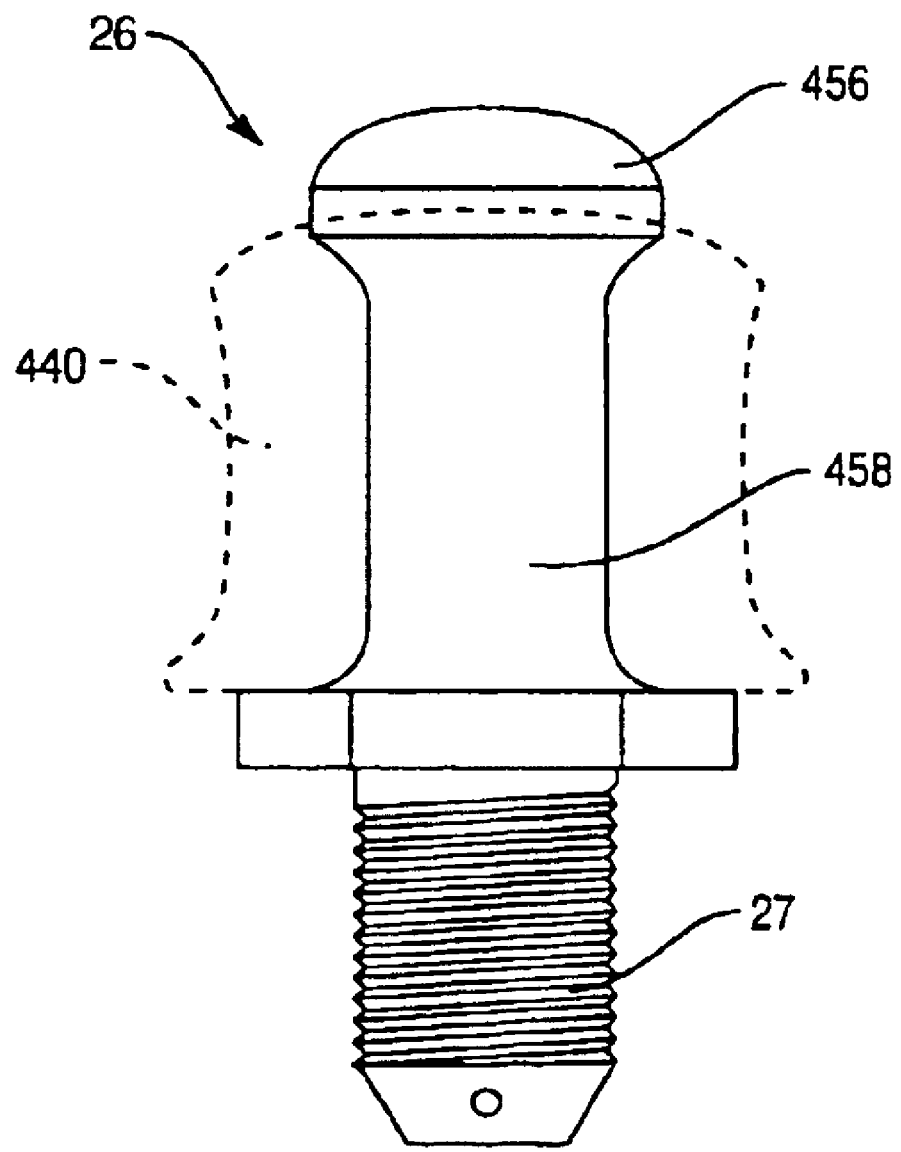
FIG. 24 is a perspective view of a pintle having a silencing spacer in accordance with the invention.

Referring to FIGS. 22 and 24, a hitch 26 may instead be embodied as a ball hitch 26 or as a conventional pintle hitch 26. Either type of hitch 26 be used as a pintle and thus may make use of a spacer 440. In that role a pintle hitch 26, in accordance with the present invention, may have any suitable geometry. The pintle hitch 26 may be formed to have a crown 456 for making contact with a retainer 60. The crown 456 may be supported by a neck 458. The neck 458 may have a diameter selected to provide sufficient strength to accommodate desired towing loads. In addition, the neck 458 may be shaped to engage or retain a spacer 440. For example, the neck 458 may be narrower than the crown 456 such that force is required to deform a spacer 440 having a diameter 446 substantially the same as that of the neck 458 in order to pass it over the crown 456. Alternatively, the spacer 440 may be formed around the neck 458.

Figure 25:
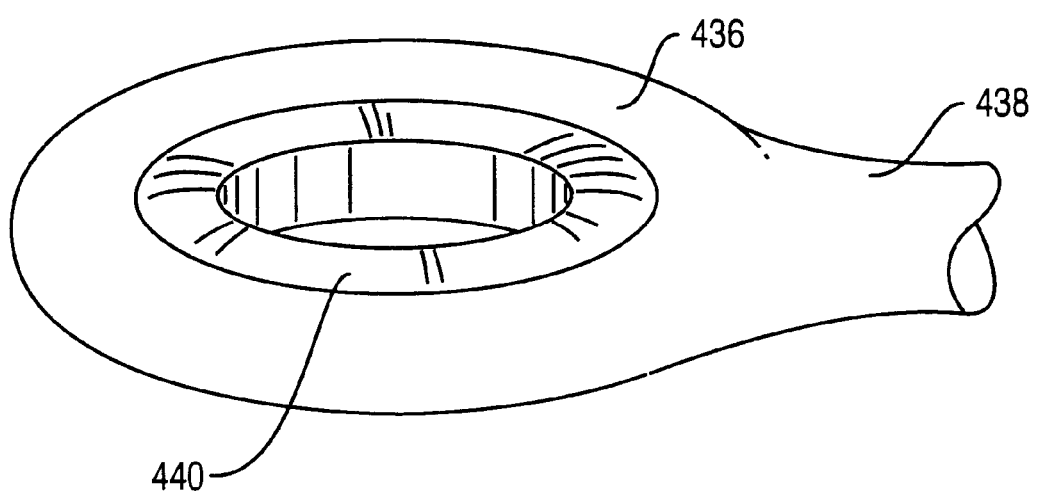
FIG. 25 is a perspective view of a pintle ring having a silencing spacer secured to a pintle ring in accordance with the invention.
Figure 26:
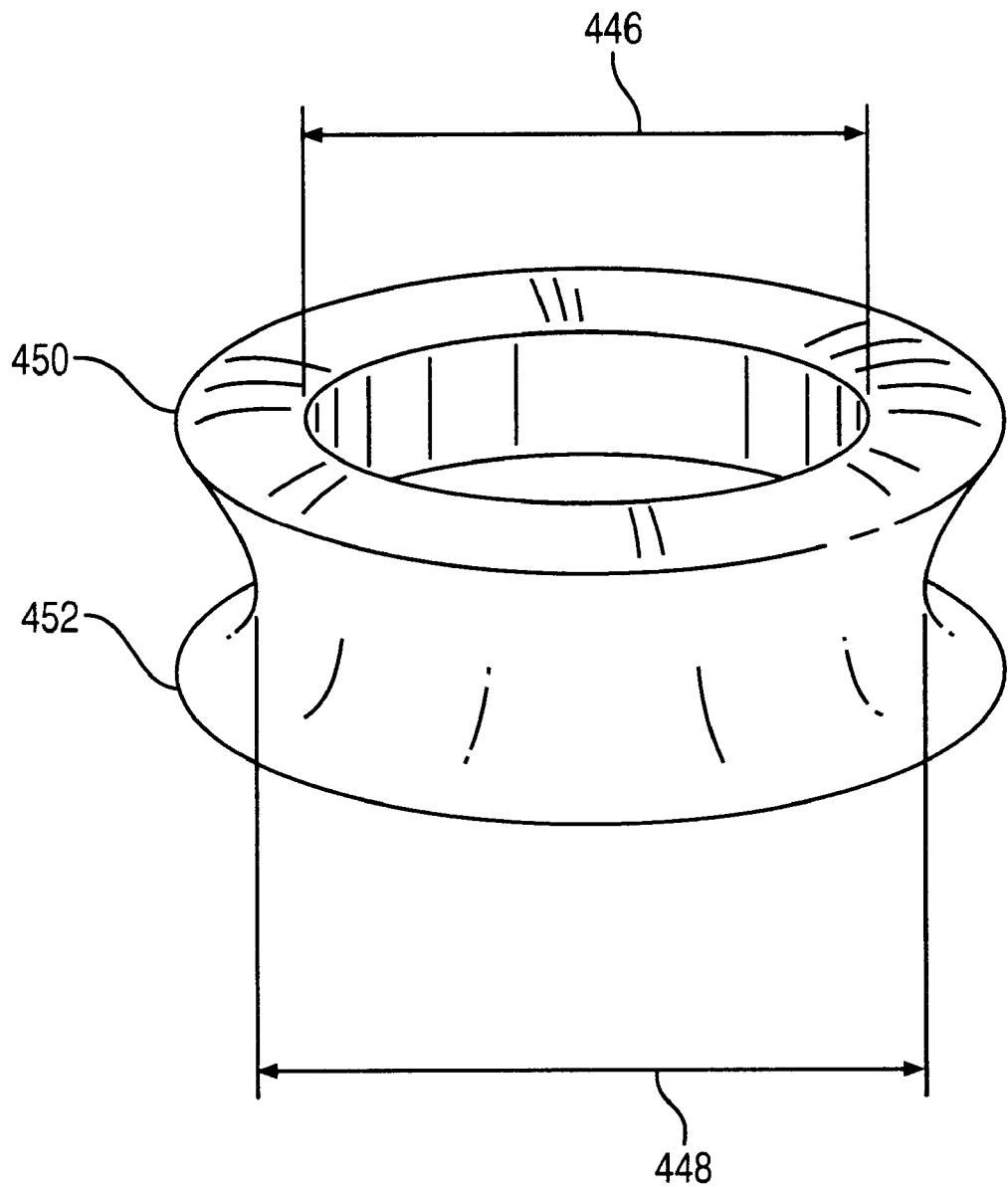
FIG. 26 is a perspective view of a silencing spacer suitable for securing to a pintle ring in accordance with the invention.

Referring to FIGS. 25 and 26, a spacer 440 may be formed to remain attached to a pintle ring 436 during normal operation. Accordingly a lip 450 and base 452 may extend far enough such that the spacer 440 will remain attached to the pintle ring 436 when it is passed over a hitch 26. The diameter 446 may also be made sufficiently large such that passing the pintle ring 436 over a hitch 26 does not cause detachment of the spacer 440 from the pintle ring 436. In one embodiment, the spacer 440 may be formed onto the pintle ring 436.

The various embodiments of mounts 19, bases 17, pintle assemblies 58, spacers, and the like provide for a large number of different combinations. The applications incorporated herein by reference present additional possible embodiments of mounts, bases, and the like. Combinations of the above mentioned embodiments, yielding an apparatus 10 in accordance with the invention, are therefore also within the scope of the present invention. Combinations of the various embodiments of the components of the above described invention are therefore hereby disclosed in sufficient detail as examples to allow one skilled in the art to make and use the same without undue experimentation.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An apparatus for securing a hitch to a vehicle, the apparatus comprising:

a mount having longitudinal, lateral, and transverse directions substantially mutually orthogonal to one another, the mount having a platform portion thereof to receive a hitch the mount also having a first locking aperture and a second locking aperture formed therein;

a retainer for selectively retaining an object extending around the hitch, the retainer having a forward end and a rearward end, the forward end pivoting with respect to the mount between a first, retaining position and a second, open position the retainer having at least one opening formed therein; and a lock configured to selectively retain the retainer in the first position when the first locking aperture is aligned with the at least one opening or in the second position when the second locking aperture is aligned with the at least one opening.

2. The apparatus of claim 1, wherein the apparatus further comprises a base having a guide integral thereto, the mount having a pivot pivotably securing the mount to the base, and wherein the pivot and mount are translatable along the guide.

3. The apparatus of claim 2, wherein the guide extends in the transverse direction and the pivot extends in the lateral direction to engage the guide.

4. The apparatus of claim 3, further comprising the hitch fixed to the mount to extend substantially between the mount and the retainer in the first position for securely connecting to a towed device.

5. The apparatus of claim 3, wherein the retainer comprises a plate of uniform thickness in a direction perpendicular to a lateral axis.

6. The apparatus of claim 3, wherein the first member extends laterally to support pivoting of the retainer perpendicular thereto.

7. The apparatus of claim 1, wherein the platform portion further comprises a registration member for locking the hitch against rotation with respect thereto.

8. The apparatus of claim 7, wherein the registration member further comprises a shoulder spaced to register the hitch substantially flush there-against to substantially prevent rotation.

9. The apparatus of claim 1, wherein the apparatus further comprises a base having a guide integral therto, the mount having a pivot pivotably securing the mount to the base, and wherein the pivot and the mount are translatable along the guide.

10. The apparatus of claim 9 wherein the extends in the transverse direction and the pivot extends in the lateral direction to engage the guide.

11. The apparatus of claim 10, wherein the mount is rotatable about the pivot and translatable with respect to the base to move between a deployed position suitable for towing a towed device, and a stowed position.

12. The apparatus of claim 1, further comprising:

a base; and a pivot pivotably securing the mount to the base to move between a deployed position suitable for towing a towed device, and a stowed position.

13. The apparatus of claim 1, wherein the lock comprises a locking pin selectively extending through at least one aperture of the first locking aperture and the second locking aperture defined in the mount and the at least one opening defined in the retainer.

14. The apparatus of claim 13, wherein the locking pin is selectively removable and engageable in the lateral direction with respect to the at least one opening defined in the retainer to selectively lock the retainer in the first and second positions.

15. The apparatus of claim 1, further comprising:

a base having a slot extending in the transverse direction to receive a pivot member;

the pivot member extending laterally between the mount and the base to translate transversely along the slot; and the mount being pivotable about the pivot member between a deployed position substantially longitudinally behind the base and a stowed position substantially longitudinally in front of the base.

16. The apparatus of claim 15, further comprising a height adjustment locator to fix the mount with respect to the base against relative translation therebetween.

17. The apparatus of claim 16, wherein the height adjustment locator comprises a pin, the base includes a plurality of apertures defined therein and the mount includes at least one aperture therein and wherein the plurality of apertures defined in the base and the at least one aperture defined in the mount are configured to removably receive the pin to selectively fix the height of the mount with respect to the base.

18. The apparatus of claim 17, wherein the slot and the plurality of apertures defined in the base are substantially collinear.

19. The apparatus of claim 3, wherein the first member extends laterally to support pivoting of the retainer perpendicular thereto.

20. The apparatus of claim 19, wherein the retainer comprises a plate of uniform thickness in a direction perpendicular to a lateral axis.

21. The apparatus of claim 20, wherein the platform portion further comprises a registration member for locking a hitch against rotation with respect thereto.

22. The apparatus of claim 21, wherein the registration member further comprises a shoulder spaced to register the hitch substantially flush there-against to substantially prevent rotation.

23. The apparatus of claim 22, wherein the apparatus further comprises a base having a mount guide integral thereto, the mount having a pivot pivotably securing the mount to the base, and the pivot being translatable along the mount guide.

24. The apparatus of claim 23, wherein the mount guide extends in the transverse direction and the pivot extends in the lateral direction to engage the mount guide.

25. The apparatus of claim 24, wherein the mount is rotatable about the pivot and translatable with respect to the base to move between a deployed position suitable for towing a towed device, and a stowed position.

26. The apparatus of claim 25, wherein the lock comprises a locking pin selectively extending through apertures in the mount and retainer.

27. The apparatus of claim 26, wherein the mount guide comprises a slot extending in a transverse direction to receive a second pivot, and wherein the pivot extends laterally between the mount and the base to translate transversely along the slot.

28. The apparatus of claim 27, further comprising a height adjustment locator to fix the mount with respect to the base against relative translation therebetween.

29. The apparatus of claim 28 wherein the height adjustment locator comprises a pin and the base and mount are further provided with height adjustment apertures to receive the pin to selectively fix the height of the mount with respect to the base.

30. The apparatus of claim 29, wherein the slot and the height adjustment apertures are substantially collinear.

31. The apparatus of claim 30, wherein the hitch is fixed to the mount to extend substantially between the mount and the retainer in the first position for securely connecting to a towed device.

32. An apparatus for securing a hitch to a vehicle, the apparatus comprising:
   a mount having a platform portion thereof coupled to a hitch;
   a retainer for selectively retaining an object extending around the hitch, the retainer having a proximal end, and a rearward end;
   a base secured to a vehicle;
   a pivot member pivotably securing the mount to the base, the mount being pivotable about the pivot member between deployed and stowed positions; and
   wherein the hitch is rotatable between a first position and at least a second position relative to the retainer.

33. An apparatus of securing a hitch to a vehicle, the apparatus comprising:
   a base having longitudinal, lateral, and transverse directions substantially mutually orthogonal to one another, the base comprising locating apertures extending in the lateral direction;
   slots located on opposite sides of the base and extending into the base in lateral direction and extending along the base in the transverse direction;
   a mount for supporting a hitch and having pivot apertures and mount locking apertures;
   pivots extending through the pivot apertures and into the slots, the pivots slidably engaging the slots in the transverse direction;
   a lock selectively passing through the mount locking apertures and the locating apertures to restrain translation of the mount relative to the base;
   the mount further comprising:
      a platform configured to be coupled with the hitch;
      a retainer for securing towed vehicles to the hitch;
      a second pivot, the second pivot pivotably securing the retainer to the mount;
      retainer locking apertures arranged for selective locking of the retainer in open and closed positions; and
      a second lock selectively engaging the retainer locking apertures and the retainer substantially preventing motion of the retainer relative to the mount.

* * * * *